(12) United States Patent
Makled et al.

(10) Patent No.: US 9,528,448 B2
(45) Date of Patent: Dec. 27, 2016

(54) METHODS AND SYSTEM FOR FUEL ETHANOL CONTENT ESTIMATION AND ENGINE CONTROL

(71) Applicant: Ford Global Technologies, LLC, Dearborn, MI (US)

(72) Inventors: Daniel A. Makled, Dearborn, MI (US); Gopichandra Surnilla, West Bloomfield, MI (US); Richard E. Soltis, Saline, MI (US); Evangelos P. Skoures, Detroit, MI (US); Jacobus Hendrik Visser, Farmington Hills, MI (US); Timothy Joseph Clark, Livonia, MI (US); David James Scholl, Huntington Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 14/626,623

(22) Filed: Feb. 19, 2015

(65) Prior Publication Data

US 2016/0245193 A1    Aug. 25, 2016

(51) Int. Cl.
| | | |
|---|---|---|
| *F02D 19/08* | (2006.01) | |
| *F02D 41/14* | (2006.01) | |
| *F02D 35/00* | (2006.01) | |
| *F02D 19/06* | (2006.01) | |
| *G01M 15/10* | (2006.01) | |

(52) U.S. Cl.
CPC ........... *F02D 19/088* (2013.01); *F02D 19/084* (2013.01); *F02D 35/0015* (2013.01); *F02D 41/1454* (2013.01); *G01M 15/104* (2013.01)

(58) Field of Classification Search
CPC .. F02D 19/088; F02D 19/084; F02D 35/0015; F02D 41/1454; G01M 15/104
USPC ............ 701/109, 103, 102; 123/703; 60/276
See application file for complete search history.

(56) References Cited

U.S. PATENT DOCUMENTS

| | | | |
|---|---|---|---|
| 6,016,796 A | 1/2000 | Dalton | |
| 6,997,172 B2 * | 2/2006 | Oshimi | ............... F02D 41/0025 123/1 A |
| 8,495,996 B2 | 7/2013 | Soltis et al. | |
| 8,522,760 B2 | 9/2013 | Soltis | |
| 8,603,310 B2 | 12/2013 | Ishida et al. | |
| 8,731,806 B2 | 5/2014 | Soltis et al. | |

(Continued)

OTHER PUBLICATIONS

Surnilla, G. et al., "Methods and Systems for Operating a Variable Voltage Oxygen Sensor," U.S. Appl. No. 14/517,601, filed Oct. 14, 2014, 42 pages.

(Continued)

*Primary Examiner* — Mahmoud Gimie
(74) *Attorney, Agent, or Firm* — Julia Voutyras; Alleman Hall McCoy Russell & Tuttle LLP

(57) ABSTRACT

Methods and systems are provided for determining an amount of alcohol in fuel injected into an engine based on outputs from an exhaust gas sensor. In one example, a method includes estimating a first fuel alcohol content based on an air-fuel ratio estimated with the exhaust oxygen sensor and estimating a second fuel alcohol content based on a change in sensor output during modulating a reference voltage of the exhaust oxygen sensor between a first and second voltage. The method further includes adjusting engine operation based on a difference between the first and second fuel alcohol contents.

20 Claims, 11 Drawing Sheets

(56) References Cited

U.S. PATENT DOCUMENTS

| | | | |
|---|---|---|---|
| 8,857,155 | B2 | 10/2014 | Surnilla et al. |
| 9,017,217 | B2 | 4/2015 | Norman et al. |
| 2012/0031374 | A1* | 2/2012 | Hokuto ................. F02D 35/027 123/445 |
| 2013/0213362 | A1* | 8/2013 | Chiba .................... F02M 43/04 123/478 |
| 2014/0156172 | A1 | 6/2014 | Surnilla et al. |
| 2014/0202437 | A1 | 7/2014 | Surnilla et al. |
| 2014/0238368 | A1 | 8/2014 | Jammoussi et al. |
| 2014/0345584 | A1 | 11/2014 | Jammoussi et al. |
| 2015/0101328 | A1 | 4/2015 | Surnilla et al. |
| 2015/0121864 | A1 | 5/2015 | Surnilla et al. |

OTHER PUBLICATIONS

Surnilla, G. et al., "Methods and Systems for Fuel Ethanol Content Determination via an Oxygen Sensor," U.S. Appl. No. 14/151,574, filed Jan. 9, 2014, 31 pages.

Surnilla, G. et al., "Methods and Systems for Fuel Ethanol Content Determination via an Oxygen Sensor," U.S. Appl. No. 14/297,301, filed Jun. 5, 2014, 35 pages.

Demarco, J. et al., "Engine Speed Control Via Alternator Load Shedding," U.S. Appl. No. 14/614,881, filed Feb. 5, 2015, 50 pages.

MacNeille, P. et al., "System and Method for Estimating Ambient Humidity," U.S. Appl. No. 14/286,631, filed May 23, 2014, 50 pages.

Vigild, C. et al., "Methods and Systems for Fuel Canister Purge Flow Estimation with an Intake Oxygen Sensor," U.S. Appl. No. 14/155,261, filed Jan. 14, 2014, 51 pages.

Surnilla, G. et al., "Methods and Systems for Humidity Determination via an Oxygen Sensor," U.S. Appl. No. 14/626,308, filed Feb. 15, 2015, 40 pages.

Makled, D. et al., "Methods and Systems for Estimating Air-Fuel Ratio with a Variable Voltage Oxygen Sensor," U.S. Appl. No. 14/626,542, filed Feb. 19, 2015, 47 pages.

Makled, D. et al., "Ambient Humidity Detection Transmission Shifts," U.S. Appl. No. 14/626,193, filed Feb. 19, 2015, 43 pages.

\* cited by examiner

METHODS AND SYSTEM FOR FUEL ETHANOL CONTENT ESTIMATION AND ENGINE CONTROL

FIELD

The present application relates generally to an exhaust gas sensor coupled to an exhaust system of an internal combustion engine.

BACKGROUND/SUMMARY

An exhaust gas sensor (e.g., exhaust oxygen sensor) may be positioned in an exhaust system of a vehicle and operated to provide indications of various exhaust gas constituents. In one example, the exhaust gas sensor may be used to detect an air-fuel ratio of exhaust gas exhausted from an internal combustion engine of the vehicle. The exhaust gas sensor readings may then be used to control operation of the internal combustion engine to propel the vehicle. Additionally, a first estimate of an alcohol content of fuel burned in the engine may be determined based on the air-fuel ratio. For example, U.S. Pat. No. 6,016,796 describes a method for determining an air-fuel ratio following a re-fueling event and then updating a fuel ethanol content estimate based on the determined air-fuel ratio.

In another example, outputs of the exhaust gas sensor may be used to estimate a water content in the exhaust gas. Water content estimated using the exhaust gas oxygen sensor may be used to infer an ambient humidity during engine operation. Further still, the water content may be used to infer a second fuel ethanol content estimate. Under select conditions, the exhaust gas sensor may be operated as a variable voltage (VVs) oxygen sensor in order to more accurately determine exhaust water content and fuel ethanol content. When operating in the VVs mode, a reference voltage of the exhaust gas sensor is increased from a lower, base voltage (e.g., approximately 450 mv) to a higher, target voltage (e.g., in a range of 900-1100 mV). In some examples, the higher, target voltage may be a voltage at which water molecules are partially or fully dissociated at the oxygen sensor while the base voltage is a voltage at which water molecules are not dissociated at the sensor.

However, the inventors herein have recognized that each of the above-described methods for estimating the fuel ethanol content may have various noise factors (e.g., ambient humidity, pressure, air-fuel ratio) that may reduce the accuracy of the estimate under certain operating conditions. Further, operation of the exhaust oxygen sensor in the VVs mode may not be possible until engine temperatures have increased above a threshold level. Further still, continuously operating the exhaust oxygen sensor in the VVs mode, and particularly at the higher target voltage, may result in sensor degradation. Inaccurate fuel ethanol content estimates may result in reduced engine control.

In one example, the issues described above may be addressed by a method for estimating a first fuel alcohol content based on an air-fuel ratio estimated with an exhaust oxygen sensor; after an engine temperature increases above a threshold, estimating a second fuel alcohol content based on a change in sensor output during modulating a reference voltage of the exhaust oxygen sensor between a first and second voltage; and adjusting engine operation based on a difference between the first and second fuel alcohol contents. In this way, errors in the fuel alcohol content estimate may be reduced and a more accurate fuel alcohol content estimated may be selected for engine control, thereby increasing engine performance and fuel economy.

As one example, responsive to modulating the voltage of the exhaust oxygen sensor between the first and second voltages, first and second pumping currents may be generated. The first pumping current may be indicative of an amount of oxygen in a sample gas while the second pumping current may be indicative of the amount of oxygen in the sample gas plus an amount of oxygen contained in water molecules in the sample gas. The first and second pumping currents may then be corrected based on one or more of deviations of an expected air-fuel ratio (at which the engine is thought to be operating) from an estimated air-fuel ratio (at which the engine is actually operating), ambient humidity, pressure, and a water vapor environment of the sensor (e.g., whether the engine is current injecting fuel or not). The corrected values may then be used to compute a water content, and infer an alcohol content of burned fuel with higher accuracy and reliability. However, since operating the oxygen sensor at the higher second voltage may degrade the sensor time, it may be desirable to adjust engine operation based on the first fuel alcohol content determined while the oxygen sensor is operating at the first voltage. For example, when the difference between the first and second fuel alcohol content estimates is less than a threshold, an engine controller may adjust engine operation based on the first fuel alcohol content and not the second. Conversely if the difference between the first and second fuel alcohol content estimates is greater than the threshold, the engine controller may adjust engine operation based on the second fuel alcohol content and not the first. In this way, following an engine re-fueling event, a fuel alcohol content estimate may be determined. By comparing the two different estimates, the most accurate fuel alcohol content estimate may be selected and used for increased engine control while at the same time reducing the amount of time the sensor spends operating in a variable voltage mode.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
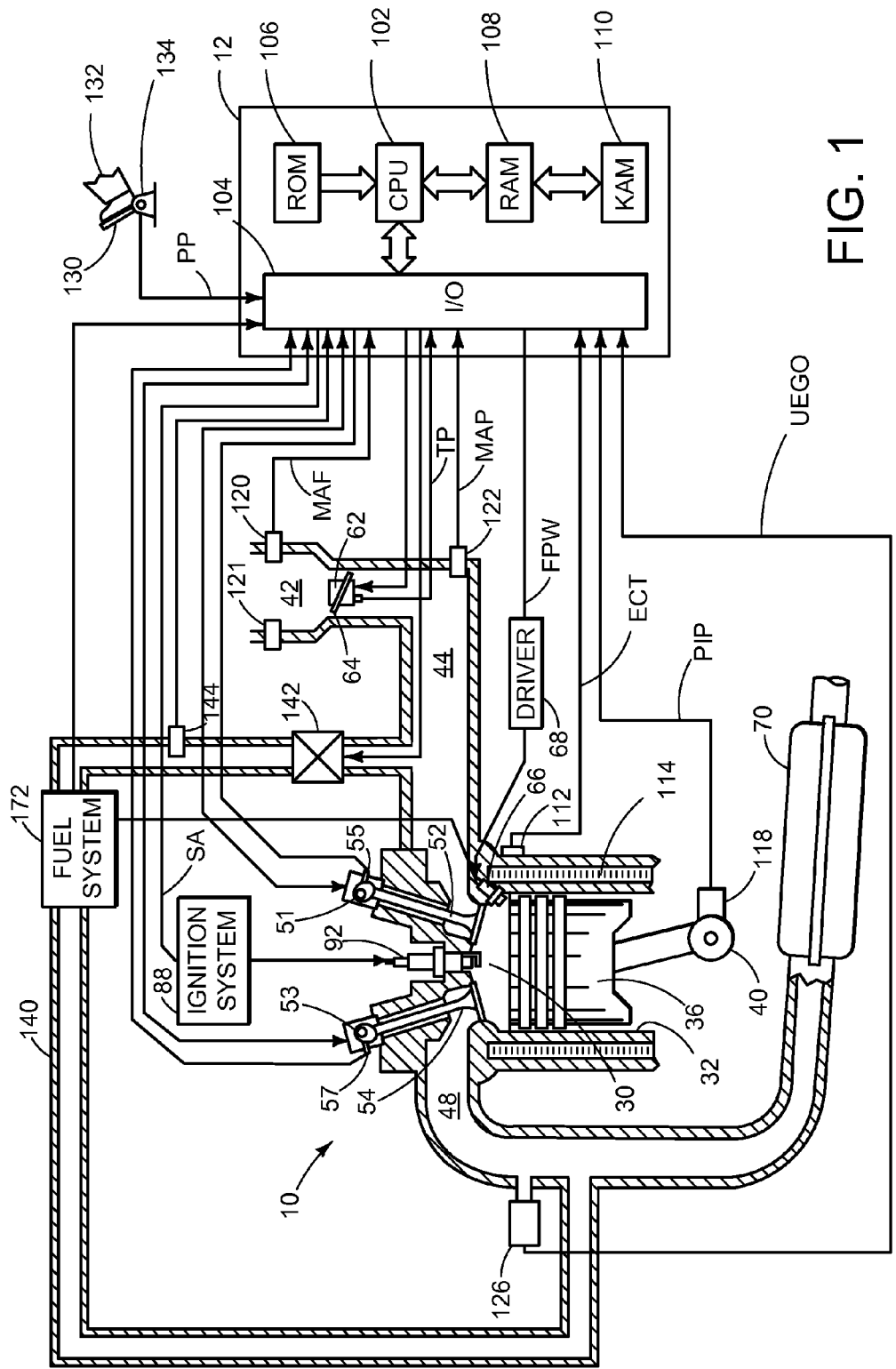
FIG. 1 shows a schematic diagram of an engine including an exhaust system and an exhaust gas sensor.
Figure 2:
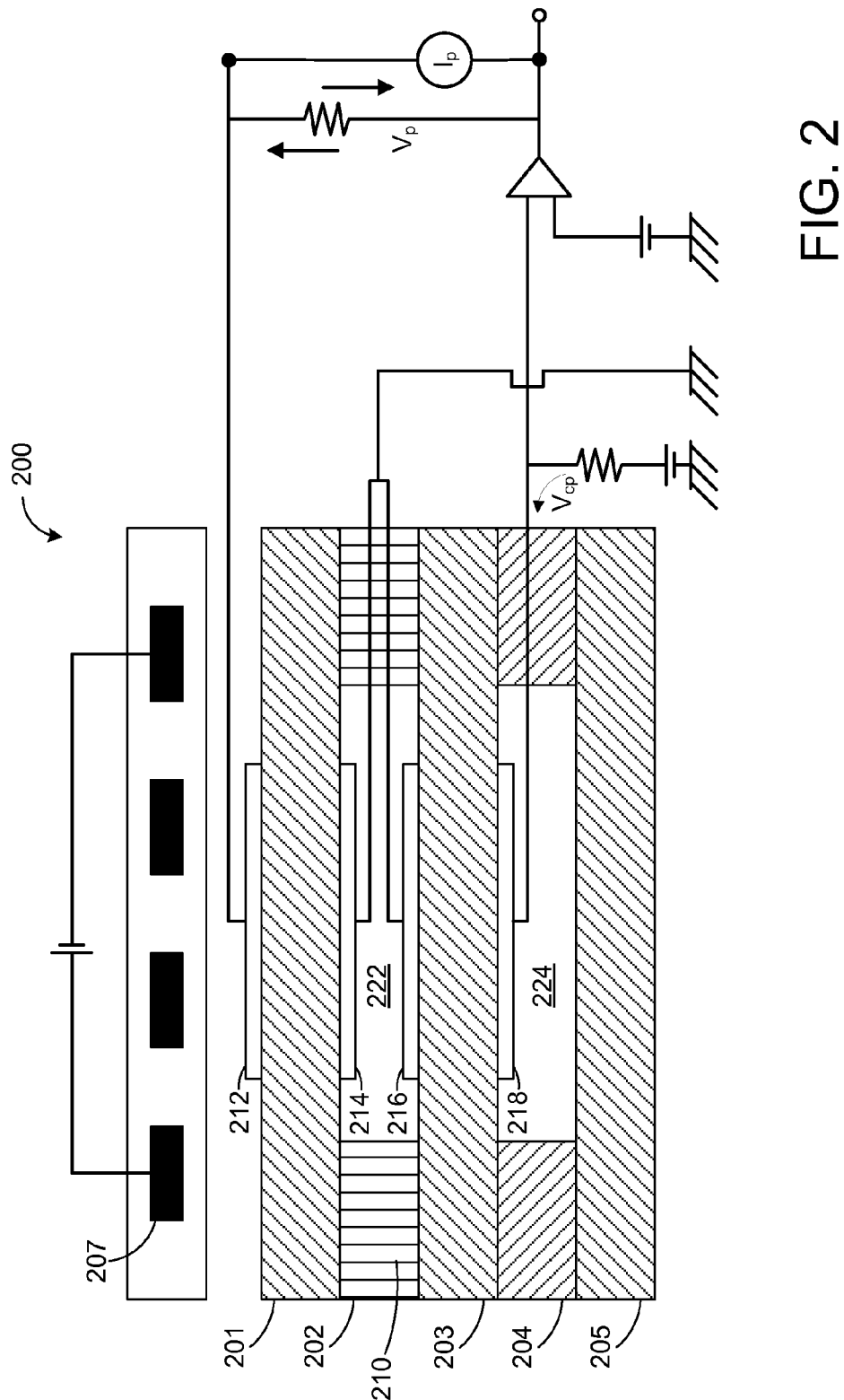
FIG. 2 shows a schematic diagram of an example exhaust gas sensor.
Figure 3A:
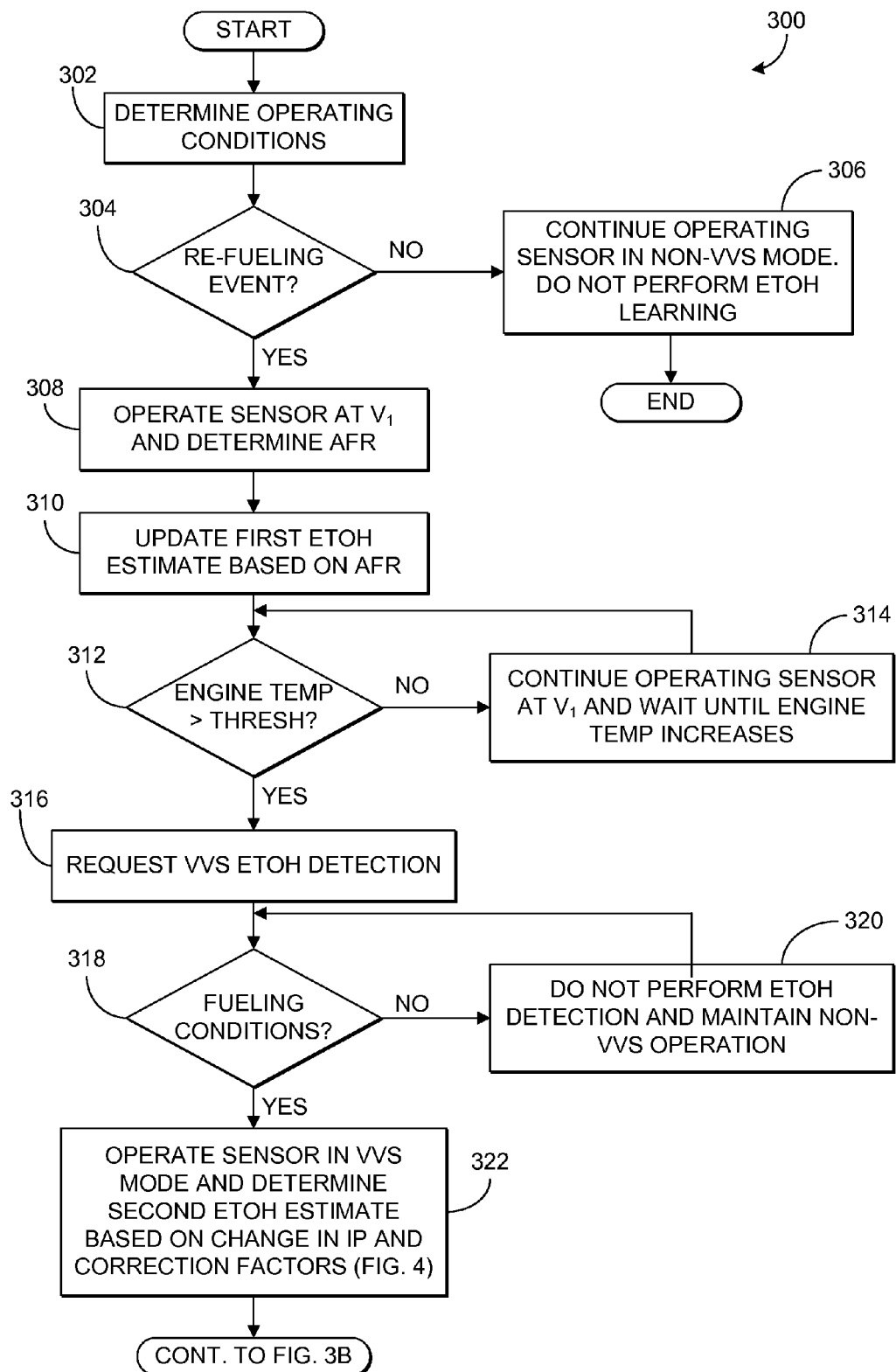
FIGS. 3A-B show a flow chart illustrating a routine for adjusting engine operation based on an error between two different estimates of an alcohol content of fuel burned in the engine.
Figure 3B:
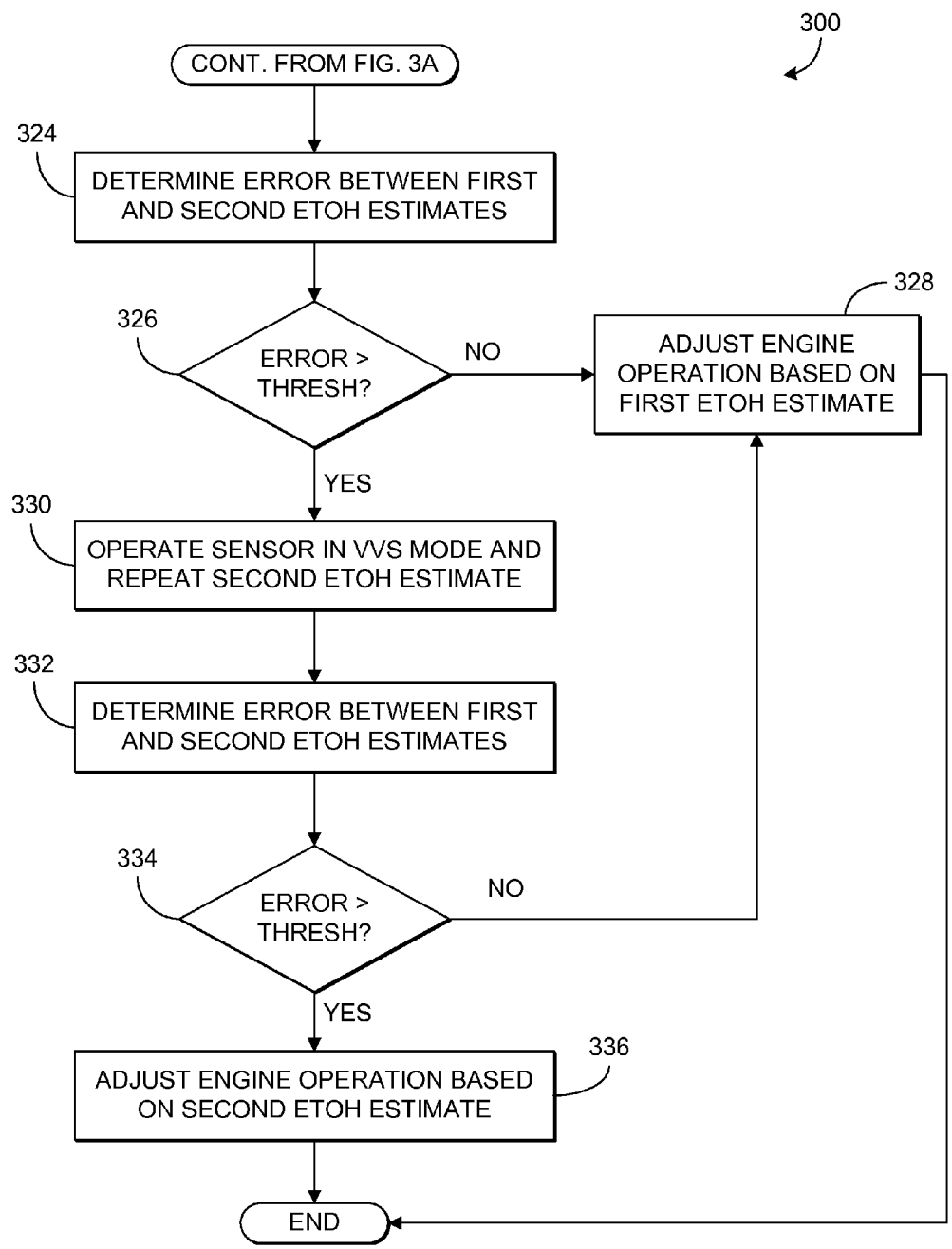
Figure 4:
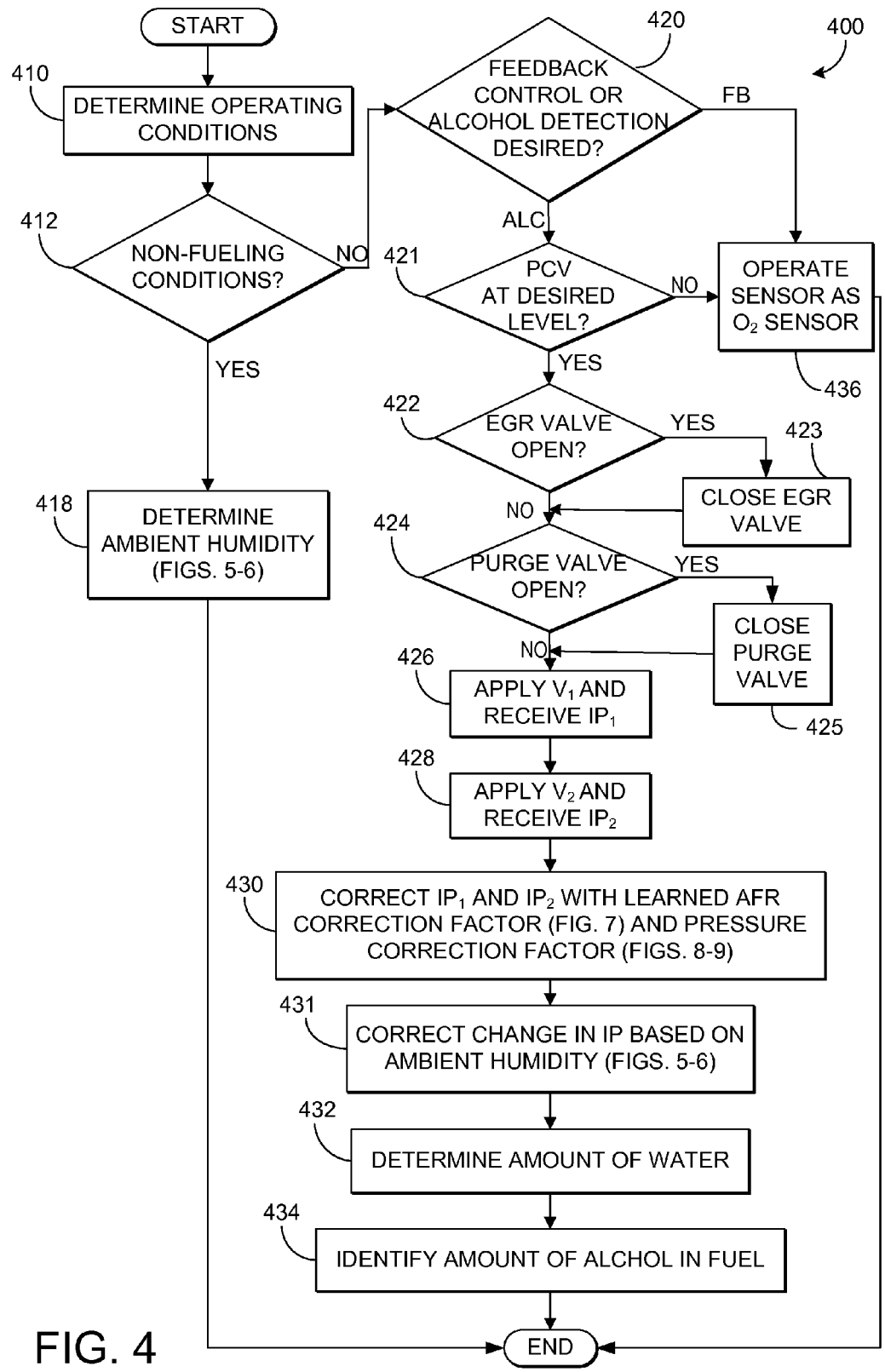
FIG. 4 shows a flow chart illustrating a routine for accurately estimating an amount of alcohol in fuel with an exhaust gas sensor operating in a variable voltage mode.

The following description relates to systems and methods for determining an amount of alcohol in a fuel mixture (e.g., ethanol and gasoline) based on outputs from an exhaust gas sensor, such as an oxygen sensor as shown in FIGS. 1-2 (referred to herein as an exhaust oxygen sensor). As shown in FIGS. 3A-B, during a first condition, the exhaust oxygen sensor may be used to determine an air-fuel ratio and then determine a first alcohol content of the fuel mixture based on the air-fuel ratio. The first alcohol content may be determined while the exhaust oxygen sensor is operating in a base mode where the reference voltage of the sensor is maintained at a lower first level. During a second condition, as shown at FIG. 4, the exhaust gas sensor may be used to determine an amount of water in a sample gas which represents an amount of water in the exhaust gas at the time of the measurement. For example, first and second voltages (the second voltage higher than the first voltage) may be alternately applied to the sensor to generate first and second pumping currents (e.g., sensor outputs). The change in pumping current between the first and second pumping currents may then be used to determine the amount of water in the exhaust and subsequently a second alcohol content of the fuel mixture. In some embodiments, the change in pumping current may be corrected for various noise factors including ambient humidity, air-fuel ratio, and/or pressure. The corrected change in pumping current may then be used to determine a more accurate second alcohol content of the fuel mixture. Methods for determining the various correction factors for the exhaust oxygen sensor output are shown at FIGS. 5-9. By comparing the first and second alcohol content estimates to one another, the most accurate alcohol content may be selected and used for engine control. In one example, as shown at FIG. 10, engine operating parameters such as spark timing and/or fuel injection amount may be adjusted based on the detected amount of alcohol in the fuel. In this manner, engine performance, fuel economy, and/or emissions may be maintained or improved despite the varying amounts of alcohol in the fuel.

Referring now to FIG. 1, a schematic diagram showing one cylinder of multi-cylinder engine 10, which may be included in a propulsion system of an automobile, is illustrated. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT), and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In some embodiments, each cylinder of engine 10 may be configured with one or more fuel injectors for providing fuel thereto. As a non-limiting example, cylinder 30 is shown including one fuel injector 66. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection (hereafter also referred to as "DI") of fuel into combustion cylinder 30.

It will be appreciated that in an alternate embodiment, injector 66 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Fuel tank in fuel system 172 may hold fuels with different fuel qualities, such as different fuel compositions. These differences may include different alcohol content, different octane, different heats of vaporization, different fuel blends, and/or combinations thereof etc. The engine may use an alcohol containing fuel blend such as E85 (which is approximately 85% ethanol and 15% gasoline) or M85 (which is approximately 85% methanol and 15% gasoline). Alternatively, the engine may operate with other ratios of gasoline and ethanol stored in the tank, including 100% gasoline and 100% ethanol, and variable ratios therebetween, depending on the alcohol content of fuel supplied by the operator to the tank. Moreover, fuel characteristics of the fuel tank may vary frequently. In one example, a driver may refill the fuel tank with E85 one day, and E10 the next, and E50 the next. As such, based on the level and composition of the fuel remaining in the tank at the time of refilling, the fuel tank composition may change dynamically.

The day to day variations in tank refilling can thus result in frequently varying fuel composition of the fuel in fuel system 172, thereby affecting the fuel composition and/or fuel quality delivered by injector 66. The different fuel compositions injected by injector 166 may herein be referred to as a fuel type. In one example, the different fuel compositions may be qualitatively described by their research octane number (RON) rating, alcohol percentage, ethanol percentage, etc.

It will be appreciated that while in one embodiment, the engine may be operated by injecting the variable fuel blend via a direct injector, in alternate embodiments, the engine may be operated by using two injectors and varying a relative amount of injection from each injector. It will be further appreciated that when operating the engine with a boost from a boosting device such as a turbocharger or supercharger (not shown), the boosting limit may be increased as an alcohol content of the variable fuel blend is increased.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12. In one embodiment, the intake passage 42 may additionally include a humidity sensor 121 for measuring ambient humidity. In another embodiment, the humidity sensor 121 may additionally or alternatively be placed in the exhaust passage 48.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 (e.g., exhaust oxygen sensor) is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Further, in the disclosed embodiments, an exhaust gas recirculation (EGR) system may route a desired portion of exhaust gas from exhaust passage 48 to intake passage 44 via EGR passage 140. The amount of EGR provided to intake passage 44 may be varied by controller 12 via EGR valve 142. Further, an EGR sensor 144 may be arranged within the EGR passage and may provide an indication of one or more of pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

Next, FIG. 2 shows a schematic view of an example embodiment of a UEGO sensor 200 configured to measure a concentration of oxygen (O2) in an exhaust gas stream. Sensor 200 may operate as UEGO sensor 126 of FIG. 1, for example. Sensor 200 comprises a plurality of layers of one or more ceramic materials arranged in a stacked configuration. In the embodiment of FIG. 2, five ceramic layers are depicted as layers 201, 202, 203, 204, and 205. These layers include one or more layers of a solid electrolyte capable of conducting ionic oxygen. Examples of suitable solid electrolytes include, but are not limited to, zirconium oxide-based materials. Further, in some embodiments, a heater 207 may be disposed in thermal communication with the layers to increase the ionic conductivity of the layers. While the depicted UEGO sensor is formed from five ceramic layers, it will be appreciated that the UEGO sensor may include other suitable numbers of ceramic layers.

Layer 202 includes a material or materials creating a diffusion path 210. Diffusion path 210 is configured to introduce exhaust gases into a first internal cavity 222 via diffusion. Diffusion path 210 may be configured to allow one or more components of exhaust gases, including but not limited to a desired analyte (e.g., O2), to diffuse into internal cavity 222 at a more limiting rate than the analyte can be pumped in or out by pumping electrodes pair 212 and 214. In this manner, a stoichiometric level of O2 may be obtained in the first internal cavity 222.

Sensor 200 further includes a second internal cavity 224 within layer 204 separated from the first internal cavity 222 by layer 203. The second internal cavity 224 is configured to maintain a constant oxygen partial pressure equivalent to a stoichiometric condition, e.g., an oxygen level present in the second internal cavity 224 is equal to that which the exhaust gas would have if the air-fuel ratio was stoichiometric. The oxygen concentration in the second internal cavity 224 is held constant by pumping voltageVcp. Herein, second internal cavity 224 may be referred to as a reference cell.

A pair of sensing electrodes 216 and 218 is disposed in communication with first internal cavity 222 and reference cell 224. The sensing electrodes pair 216 and 218 detects a concentration gradient that may develop between the first internal cavity 222 and the reference cell 224 due to an oxygen concentration in the exhaust gas that is higher than or lower than the stoichiometric level. A high oxygen concentration may be caused by a lean exhaust gas mixture, while a low oxygen concentration may be caused by a rich mixture.

A pair of pumping electrodes 212 and 214 is disposed in communication with internal cavity 222, and is configured to electrochemically pump a selected gas constituent (e.g., O2) from internal cavity 222 through layer 201 and out of sensor 200. Alternatively, the pair of pumping electrodes 212 and 214 may be configured to electrochemically pump a selected gas through layer 201 and into internal cavity 222. Herein, pumping electrodes pair 212 and 214 may be referred to as an O2 pumping cell.

Electrodes 212, 214, 216, and 218 may be made of various suitable materials. In some embodiments, electrodes 212, 214, 216, and 218 may be at least partially made of a material that catalyzes the dissociation of molecular oxygen. Examples of such materials include, but are not limited to, electrodes containing platinum and/or silver.

The process of electrochemically pumping the oxygen out of or into internal cavity 222 includes applying a voltage Vp (e.g., reference voltage) across pumping electrode pair 212 and 214. The pumping voltage Vp applied to the O2 pumping cell pumps oxygen into or out of first internal cavity 222 in order to maintain a stoichiometric level of oxygen in the cavity pumping cell. The resulting pumping current Ip is proportional to the concentration of oxygen in the exhaust gas. A control system (not shown in FIG. 2) generates the pumping current signal Ip as a function of the intensity of the applied pumping voltage Vp required to maintain a stoichiometric level within the first internal cavity 222. Thus, a lean mixture will cause oxygen to be pumped out of internal cavity 222 and a rich mixture will cause oxygen to be pumped into internal cavity 222.

It should be appreciated that the UEGO sensor described herein is merely an example embodiment of a UEGO sensor, and that other embodiments of UEGO sensors may have additional and/or alternative features and/or designs.

In this way, the oxygen sensor of FIG. 2 may be a variable voltage oxygen sensor configured to operate at a first, lower voltage (e.g., reference voltage) where water molecules are not dissociated and a second, higher voltage (e.g., reference voltage) where water molecules are fully dissociated. As such, the second voltage is higher than the first voltage.

As elaborated below, the UEGO sensor of FIG. 2 can be advantageously used to estimate an amount of alcohol in the fuel burned in the engine as well as an ambient humidity. In particular, a change in pumping current (delta Ip) output by the sensor at two different reference voltages is used to determine the amount of oxygen coming from water and/or CO2 dissociation. However, continuously operating the oxygen sensor in the variable voltage (VVs) mode, and particularly at the higher second voltage, may degrade the oxygen sensor, thereby reducing the longevity of the sensor. Thus, it may be advantageous to reduce the amount of time the oxygen sensor spends operating at the higher, second voltage. As a result, sensor degradation may be reduced, thereby increasing the longevity of the sensor and producing more accurate sensor outputs for engine control.

In another example, the exhaust oxygen sensor (e.g., UEGO sensor of FIG. 2 and/or exhaust gas sensor 126 of FIG. 1) may operate as a traditional oxygen sensor (e.g., air-fuel sensor), at only the lower, first reference voltage (e.g., approximately 450 mV). This lower voltage may be referred to herein as the base reference voltage. Said another way, the UEGO may be operated as an air-fuel sensor in order to determine an exhaust air-fuel ratio. An estimate of the ethanol content of the fuel burned in the engine (e.g., EtOH estimate) may then be estimated based on the air-fuel ratio.

As such, a first estimate of the fuel ethanol content may be determined based on an air-fuel ratio estimate from an exhaust oxygen sensor operating in a base, non-VVs mode and a second estimate of the fuel ethanol content may be determined based on a change in pumping current output by the exhaust oxygen sensor when operating in a VVs mode (e.g., during modulating a reference voltage of the sensor between a lower and higher voltage). In one example, the fuel EtOH estimate may be determined during cold conditions when the exhaust oxygen sensor is operating in the non-VVs mode, but not during VVs mode. Additionally, various noise factors that may reduce the accuracy of the fuel EtOH estimates may be present for each of the non-VVs and VVs estimate methods. For example, fuel ethanol estimates during VVs operation may be corrected for ambient humidity, air-fuel ratio, pressure, etc. The first and second fuel EtOH estimates may be compared and an error between the measurements may be used to determine which of the two estimates to use for engine control. In this way, a more accurate fuel ethanol content estimate may be estimated using an exhaust oxygen sensors, thereby increasing the accuracy of engine control, such as fuel injection, based on the fuel ethanol content estimate.

The systems of FIGS. 1-2 provide for a system comprising: an exhaust passage including an exhaust oxygen sensor and a controller including computer readable instructions for estimating a first fuel ethanol content estimate based on an air-fuel ratio estimated with the exhaust oxygen sensor following a re-fueling event; estimating a second fuel ethanol content estimate based on a change in pumping current output by the exhaust oxygen sensor upon applying a lower first voltage and a higher second voltage to the exhaust oxygen sensor when the engine is fueling and an engine temperature is greater than a threshold; and adjusting an engine operating parameter based on one of the first fuel ethanol content estimate and the second fuel ethanol content estimate, where a selection of the first or second fuel ethanol content estimate is based on a difference between the first and second fuel ethanol content estimates relative to a threshold error. The computer readable instructions further include adjusting the engine operating parameter based on the first fuel ethanol content estimate and not the second fuel ethanol content estimate when the difference between the first and second fuel ethanol content estimates is less than the threshold error and adjusting the engine operating parameter based on the second fuel ethanol content estimate and not the first fuel ethanol content estimate when the difference between the first and second fuel ethanol content estimates is greater than the threshold error.

Turning to FIGS. 3A-B, a method 300 is shown for adjusting engine operation based on an error between two different estimates of an alcohol content of fuel burned in the engine (referred to herein as fuel ethanol content or EtOH estimate). As described above, an exhaust oxygen sensor (such as exhaust gas sensor 126 shown in FIG. 1 and sensor 200 shown in FIG. 2) may be a variable voltage (VVs) sensor operable at a lower, base voltage and at a higher, target voltage. As described above, the exhaust oxygen sensor may operate as a traditional air-fuel sensor where the reference voltage of the sensor is maintained at the lower, base voltage (e.g., approximately 450 mV) where water and carbon dioxide molecules are not dissociated at the sensor (referred to herein as non-VVs operation). A first fuel ethanol content may be determined based on the exhaust air-fuel ratio estimated from the output of the exhaust oxygen sensor during non-VVs operation. Then, under select conditions, the reference voltage of the exhaust oxygen sensor may be increased from the lower, base voltage (e.g., first voltage) to a higher, target voltage (e.g., second voltage) where water molecules and/or carbon dioxide molecules are dissociated. In one example, the second voltage may be in a range of approximately 900-1100 mV. A second fuel ethanol content may then be determined based on a change in pumping current output by the exhaust oxygen sensor between the first voltage and second voltage during VVs mode operation. A difference between the first and second fuel ethanol content estimates may then be used to determine which of the two estimates should be used for engine control. Instructions for carrying out method 300 (and the other methods described below with reference to FIGS. 4-10) may be stored in a memory of a controller (e.g., controller 12 shown in FIG. 1). As such, method 300 may be executed by the controller.

Method 300 begins at 302 by estimating and/or measuring engine operating conditions. Engine operating conditions may include engine speed and/or load, engine temperature, exhaust air-fuel ratio, ambient humidity, ambient temperature, mass air flow rate, exhaust gas recirculation (EGR) flow, etc. At 304, the method includes determining if a re-fueling event has occurred since a previous fuel ethanol content estimate (or since the last run of method 300). Different geographic regions and fuel manufacturers may use different ethanol fuel blends. Changes in the fuel ethanol concentration may occur when a different ethanol blend fuel is used to re-fuel the engine. Thus, after each re-fueling event, a new fuel ethanol content estimate may be required in order to accurately adjust engine operation (e.g., fuel injection amount). Re-fueling may be determined based on a fuel level sensor disposed within a fuel tank of the vehicle. If no-refueling event is detected at 304, the method continues on to 306 to continue operating the exhaust oxygen sensor in non-VVs mode (as an air-fuel sensor) and to not perform fuel ethanol (EtOH) learning.

Alternatively, if the controller determines at 304 that a re-fueling event occurred since the last estimate, the method continues on to 308 to operate the exhaust oxygen sensor at the first reference voltage, $V_1$, (e.g., base voltage) and determine an exhaust air-fuel ratio. For example, the exhaust air-fuel ratio may be based on the pumping current output by the exhaust oxygen sensor. Continuing to 310, the method includes determining a first fuel ethanol content estimate (EtOH) based on the determined exhaust air-fuel ratio. The fuel ethanol content may be a percentage or fraction of ethanol (or other alcohol) in the fuel. The first fuel ethanol content estimate may be a function of the air-fuel ratio determined based on the output of the exhaust oxygen sensor. For example, the function may be a pre-determined relationship between air-fuel ratio (or changes in the air-fuel ratio from stoichiometry) and fuel ethanol content stored in the memory of the controller. The method at 310 may include updating a previously stored first fuel ethanol content estimate with the newly determined first fuel ethanol content. For example, the method at 310 may include updating the first fuel ethanol content estimate stored in the memory of the controller. The controller may use the updated first fuel ethanol content estimate for adjusting fuel injection, as described further below.

At 312, the method includes determining if engine temperature is greater than a threshold temperature. In one example, the threshold temperature may be based on a temperature at which the exhaust oxygen sensor may effectively operate in VVs mode. In this way, some exhaust oxygen sensor system noise factors related to colder engine temperatures may be reduced. For example, during engine cold start conditions, the engine temperature may be below the threshold temperature and operating the exhaust oxygen sensor at a higher than baseline reference voltage may not be possible, or may give inaccurate pumping current outputs. However, fuel ethanol estimates with the exhaust oxygen sensor based on air-fuel ratio during non-VVs operation may have increased accuracy over fuel ethanol estimates with the exhaust oxygen sensor during VVs operation. Thus, if the engine temperature is not greater than the threshold temperature at 312, the method proceeds to 314 to continue operating the exhaust oxygen sensor at the first voltage and wait until the engine temperature increases to operate the sensor in VVs mode. In another embodiment, the method of 312 may occur concurrently with the methods at steps 304-310. As such, as soon as the engine temperature is above the threshold temperature, the VVs oxygen sensor may operate in VVs mode and the controller may request ethanol detection via the VVs oxygen sensor as soon as selected conditions (as described further below) are met. As such, controller may not wait for the AFR fuel ethanol estimate to be determined before determining the fuel ethanol content via the exhaust oxygen sensor. Thus, both fuel ethanol learning methods (via the AFR and via the exhaust oxygen sensor) may occur at relatively the same time or one may occur before the other.

Alternatively, if the engine temperature is greater than the threshold at 312, the method continues to 316 to request VVs mode fuel ethanol content estimation. For example, the method at 316 may include setting a diagnostic flag in the controller to initiate VVs operation of the exhaust oxygen sensor and estimate the fuel ethanol content during VVs operation as soon as selected conditions are met. As such, the method continues to 318 to determine if the engine is operating under fueling conditions. For example, the engine may be operating under fueling conditions if fuel is being injected into one or more engine cylinders. If the engine is not currently fueling (e.g., injecting fuel into the engine cylinders), the method proceeds to 320 to not perform fuel ethanol detection and maintain non-VVs operation of the exhaust oxygen sensor (e.g., maintain the reference voltage of the sensor at the lower, first voltage). However, if the engine is fueling, the method instead continues on to 322 to operate the exhaust oxygen sensor in VVs mode and determine a second fuel ethanol content estimate based on a change in pumping current output by the sensor between the first and second reference voltage and various correction factors. For example, when selected conditions are met, in addition to the engine being fueled, the oxygen sensor may increase its reference voltage from the lower, first voltage to a higher, second voltage where water molecules and/or carbon dioxide are dissociated at the sensor. The change in pumping current between the two voltages may be indicative to a water content of the exhaust gas. This water content value may then be corrected for ambient humidity, pressure, and/or air-fuel ratio. Finally, the second fuel ethanol content estimate may be determined based on the corrected water content estimate. Further details on the method at 322 are presented at FIG. 4, discussed further below.

After determining both the first and second fuel ethanol estimates, the method continues on to 324 to determine an error between the first and second fuel ethanol estimates. For example, the method at 324 may include determining a difference between the first fuel ethanol estimate determined based on the air-fuel ratio determined during non-VVs operation of the exhaust oxygen sensor and the second fuel ethanol estimate determined based on the change in pumping current output by the exhaust oxygen sensor during VVs operation when the reference voltage of the sensor is modulated between the first and second voltages. The method then continues to 326 to determine if the error (e.g., difference) between the first and second fuel ethanol content estimates is greater than a threshold error (e.g., threshold difference). If the error between the first and second fuel ethanol content estimates is not greater than the threshold, the method continue to 328 to adjust engine operation based on the first fuel ethanol content estimate. In one example, adjusting engine operation may include an amount of fuel injection into the engine cylinders based on the first fuel ethanol content estimate. The method for adjusting engine operation based on the selected fuel ethanol content estimate is shown at FIG. 10, described further below. Further, in one example, the method at 328 may include continuing to adjust engine operation based on the first fuel ethanol content estimate until the next re-fueling event. As a result, an amount of time spent operating the exhaust oxygen sensor in VVs mode may be reduced, thereby increasing the longevity of the sensor (by reducing sensor degradation).

Otherwise, if the error between the first and second fuel ethanol content estimates is greater than the threshold, the method continues on to 330 to operate the exhaust oxygen sensor in VVs mode and repeat the second fuel ethanol content estimate. For example, the method at 330 may include increasing the sensor reference voltage from the first voltage to the second voltage and repeating the second fuel ethanol content estimate based on the change in pumping current between the first and second voltages. Thus, method 330 may include repeating step 322, as described above. At 332, the controller determines the error between the original first fuel ethanol content estimate and the new, repeated second fuel ethanol content estimate. If the error is not greater than the threshold error at 334, the method proceeds to 328 to adjust engine operation (e.g., engine fueling) based on the first fuel ethanol content estimate and not the second fuel ethanol content estimate. For example, the method at 328 may include adjusting engine fueling based on only the first fuel ethanol content.

Alternatively, if the error between the original first fuel ethanol content estimate and the new, repeated second fuel ethanol content estimate is still greater than the threshold error, the method continues to 336 to adjust engine operation based on the second fuel ethanol content estimate and not the first fuel ethanol content estimate. For example, the controller may adjust engine fueling based on only the second fuel ethanol content estimate, as the second estimate may have increased accuracy over the first fuel ethanol estimate. In this way, the amount of fuel injected into the engine may be more accurately determined and the resulting engine control may be improved.

Continuing to FIG. 4, a flow chart illustrating an estimation routine 400 for an exhaust oxygen sensor, such as UEGO 200 shown in FIG. 2, is shown. Specifically, routine 400 determines an amount of alcohol in the fuel injected to the engine (e.g., fuel ethanol content estimate), based on voltages applied to a pumping cell of the sensor during selected engine fueling conditions and further based on a plurality of correction factors calculated as described below with reference to FIGS. 5-9.

At 410 of routine 400, engine operating conditions are determined. Engine operating conditions may include but are not limited to air-fuel ratio, amount of EGR entering the combustion chambers, and fueling conditions, for example.

Once the engine operating conditions are determined, routine 400 continues to 412 where it is determined if the engine is under non-fueling conditions. Non-fueling conditions include vehicle deceleration conditions and engine operating conditions in which the fuel supply is interrupted but the engine continues spinning and at least one intake valve and one exhaust valve are operating; thus, air is flowing through one or more of the cylinders, but fuel is not injected in the cylinders. Under non-fueling conditions, combustion is not carried out and ambient air may move through the cylinder from the intake to the exhaust. In this way, a sensor, such as a UEGO sensor (e.g., exhaust oxygen sensor), may receive ambient air on which measurements, such as ambient humidity detection, may be performed.

As noted, non-fueling conditions may include, for example, deceleration fuel shut-off (DFSO). DFSO is responsive to the operator pedal (e.g., in response to a driver tip-out and where the vehicle accelerates greater than a threshold amount). DSFO conditions may occur repeatedly during a drive cycle, and, thus, numerous indications of the ambient humidity may be generated throughout the drive cycle, such as during each DFSO event. As such, the fuel type may be identified accurately based on an amount of water in the exhaust gas despite fluctuations in humidity between drive cycles or even during the same drive cycle.

Continuing with FIG. 4, if it is determined that the engine is under non-fueling conditions such as DFSO, routine 400 continues to 418 to determine ambient humidity using the methods of FIGS. 5-6, as described further below. Alternatively, if it is determined that the engine is not under non-fueling conditions, routine 400 of FIG. 4 moves to 420 where is it determined if feedback air-fuel ratio control based on the sensor, or alcohol detection by the sensor, is desired or to be carried out. The selection may be based on operating conditions, such as a duration since a last determination of alcohol, or whether closed loop air-fuel ratio control is enabled. For example, if feedback air-fuel ratio control is disabled, the routine may continue to determine alcohol content, whereas if feedback air-fuel ratio is commanded or enabled, the routine may continue to perform such feedback air-fuel ratio control (without determining alcohol content). For example, if there is a request for VVs fuel ethanol content detection at step 316 of method 300, alcohol detection may be selected over air-fuel ratio feedback control. If it is determined that feedback control is desired, routine 400 moves to 436 and the sensor is operated as an oxygen (e.g., 02) sensor in non-VVs mode (e.g., at the lower, base voltage) to determine an oxygen concentration and/or air-fuel ratio of the exhaust gas and the routine ends.

If alcohol detection is desired, routine 400 proceeds to 421 where it is determined if positive crankcase ventilation (PCV) is at a desired level. In one example, a PCV level may be based on engine speed and/or turbocharger operation (e.g., boosted vs. non-boosted operation). For example, if the engine speed is high, it may be estimated that there may be increased PCV flow. Other example conditions include increased manifold vacuum, increased crankcase pressure, high ambient conditions, combinations thereof, etc. If the engine speed is relatively low, PCV level may be further based on if the turbocharger is on and the engine is boosted. If the engine is under non-boosted conditions, PCV flow may be increased. On the other hand, if the engine is boosted, the flow from the PCV valve may be sufficiently low. If it is determined at 421 that the amount of PCV is above a desired level (e.g., the PCV flow is high), routine 400 moves to 436 and the sensor is operated as an oxygen sensor (in non-VVs mode) to determine an oxygen concentration of the exhaust gas for air-fuel control, for example, and the routine ends.

On the other hand, if PCV is at a desired level (e.g., the PCV flow is low), routine 400 continues to 422 where it is determined if the exhaust gas recirculation (EGR) valve is open. If it is determined that the EGR valve is open, routine 400 moves to 423 and the EGR valve is closed. Once the EGR valve is closed at 423 or if it is determined that the EGR valve is closed at 422, and thus the amount of EGR entering the combustion chamber is substantially zero, routine 400 proceeds to 424 where it is determined if the fuel vapor purge valve is open.

If it is determined that the fuel vapor purge valve is open, routine 400 moves to 425 and the fuel vapor purge valve is closed. Fuel vapor that is stored in the fuel vapor canister may have an alcohol content that is different than the fuel that is currently in the fuel tank. As such, fuel vapor entering the combustion chamber may affect the amount of alcohol detected by the exhaust oxygen sensor (e.g., UEGO) resulting in an inaccurate estimate.

Once the fuel vapor purge valve is closed at 425 or if is determined that the fuel vapor purge valve is closed at 424, routine 400 continues to 426 where a first pumping voltage (V1) (e.g., also referred to herein as reference voltage) is applied to the exhaust gas sensor and a first pumping current (Ip1) is received. The first pumping voltage may pump oxygen from the oxygen pumping cell, but may have a low enough value so as to not dissociate water (e.g., H2O) molecules in the pumping cell (e.g., V1=approximately 450 mV). In some examples, the first pumping voltage applied to the sensor at 426 may be the same as the first pumping voltage applied to the sensor during non-VVs mode operation. When the first voltage is applied to the pumping cell, the first pumping current (Ip1) is generated. In this example, because fuel is injected to the engine and combustion is carried out, the first pumping current may be indicative of an amount of oxygen in the exhaust gas.

At 428 of routine 400, a second pumping voltage (V2) (e.g., also referred to herein as the second reference voltage) is applied to the pumping cell of the exhaust gas sensor and a second pumping current (Ip2) is received. The second pumping voltage may be greater than the first pumping voltage, and the second voltage may be high enough to dissociate oxygen compounds such as water molecules. Application of the second pumping voltage across the oxygen pumping cell generates the second pumping current (Ip2). The second pumping current may be indicative of an amount of oxygen and water in the sample gas (e.g., oxygen that already exists in the sample gas plus oxygen from water molecules dissociated when the second pumping voltage is applied).

At 430, the first pumping current and the second pumping current are corrected with a learned air-fuel ratio correction factor. For example, the learned air-fuel ratio correction may be determined at 720 of routine 700 described below with reference to FIG. 7. Also at 430, the first pumping current and the second pumping current may be corrected for pressure and the water vapor environment, as determined in routines 800 and 900 described below with reference to FIGS. 8-9.

Continuing to 431, the routine includes correcting the change in pumping current (e.g., the difference between the first and second pumping currents) between the two voltages based on ambient humidity. For example, ambient humidity may be subtracted from the change in pumping current which is indicative of a total amount of water in the exhaust (including humidity). In one example, the ambient humidity may be determined based on output of the exhaust oxygen sensor during non-fueling conditions. In another example, the ambient humidity may be determined using an alternate method based on engine operating conditions. The method at 431 may include instantaneously determining the ambient humidity or looking up a most recent ambient humidity estimate in the memory of the controller. The method for determining ambient humidity is described further below with reference to FIGS. 5-6.

Once the first and second pumping currents are generated and corrected based on various learned correction factors, an amount of water in the sample gas may be determined at 432 of routine 400 in FIG. 4. For example, the first pumping current may be subtracted from the second pumping current, and then corrected based on the air-fuel ratio correction factor, the pressure correction factor, and/or ambient humidity to determine a value that corresponds to an amount of water.

Finally, the amount of alcohol in the fuel (e.g., referred to herein as the fuel ethanol content), may be identified at 434. For example, the amount of water in the exhaust gas may be proportional to an amount of alcohol (e.g., a percent of ethanol) in the fuel injected to the engine. In some embodiments, the computer readable storage medium of the control system receiving communication from the sensor may include instructions for identifying the amount of alcohol. For example, a relationship between water after combustion (e.g., percent of water in exhaust gas) and the percent of ethanol in the fuel that may be stored on the computer readable storage medium in the form of a lookup table, for example. As the amount of ethanol in the fuel increases, the amount of water in the exhaust gas increases.

Thus, based on exhaust oxygen sensor outputs (e.g., pumping currents) generated by to two different voltages applied sequentially to the oxygen pumping cell of the exhaust gas sensor during engine fueling conditions and the various correction factors described above, amounts of water in the exhaust gas may be determined. In this manner, an accurate indication of the amount of alcohol (e.g., percent ethanol) in the fuel may be identified. The amount of alcohol in the fuel determined at 434 may be the second fuel ethanol content estimate used at 322 of method 300 described above.

Figure 5:
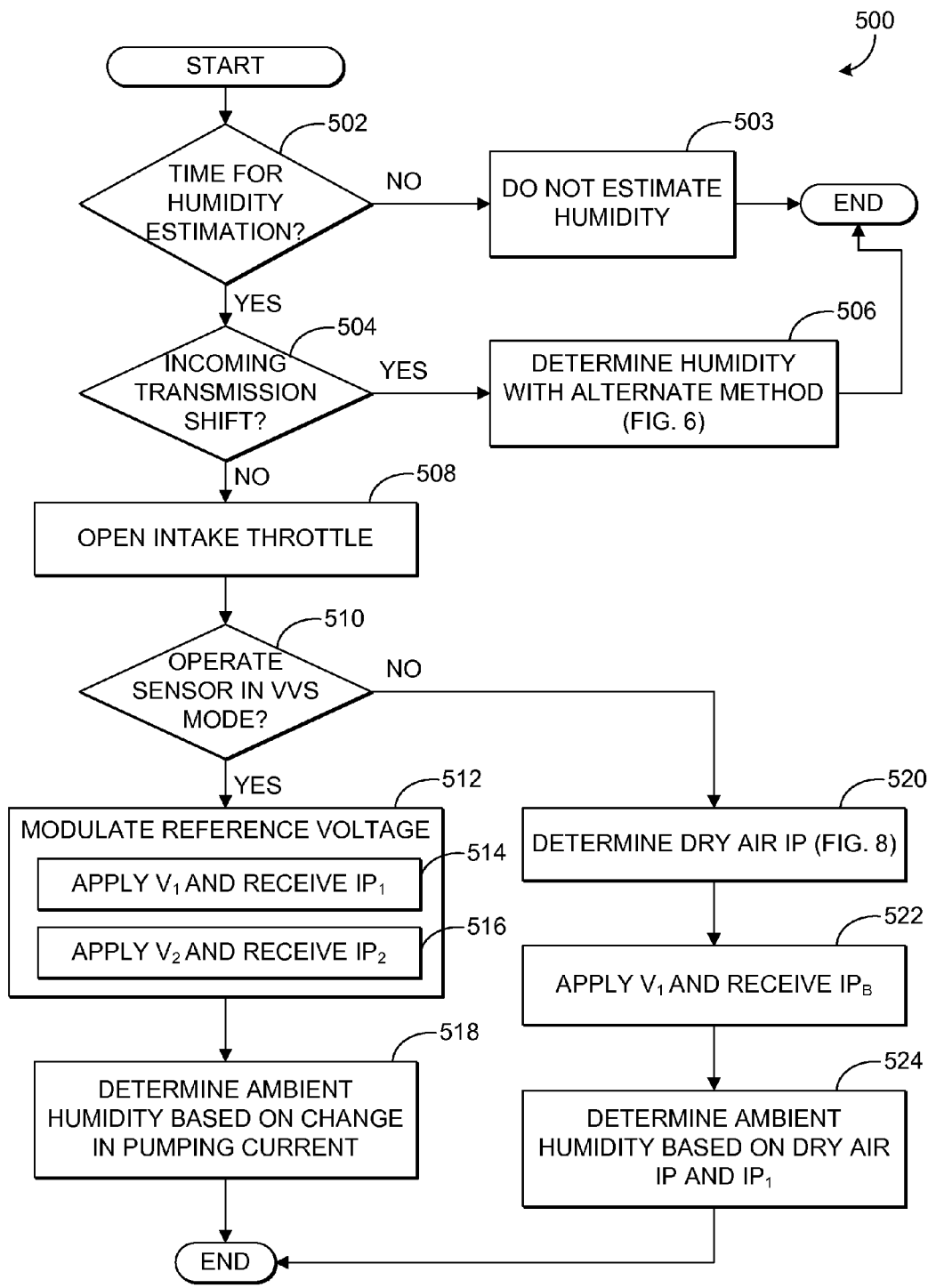
FIGS. 5-6 show flow charts illustrating routines for estimating ambient humidity.

Turning now to FIG. 5, a method 500 is shown for estimating ambient humidity with a VVs exhaust oxygen sensor (such as the exhaust oxygen sensor 126 shown in FIGS. 1 and 200 shown in FIG. 2). The method begins at 502 by determining if it is time for ambient humidity estimation. In one example, method 500 may continue from 418 of method 400, as described above. As such, if the engine is operating under non-fueling conditions, the method may continue to 504. In another example, method 500 may be executed after a duration, such as after a period of engine operation, a number of engine cylinders, a duration of vehicle travel, or after a distance of vehicle travel. In another example, method 500 may be executed upon engine start-up. If it is not time for ambient humidity estimation, the method continues to 503 to not estimate ambient humidity and the method ends. If an ambient humidity measurement is request from another control routine, the controller may look-up a previously stored ambient humidity estimate.

At 504, the method includes determining if there is an incoming transmission shift. An incoming transmission shift may be predicted based on one or more of whether or not a shift request flag has been set, observation of one or more operator pedals, and/or vehicle acceleration. During transmission shifts following non-fueling conditions (e.g., deceleration fuel-shut off), humidity detection using the exhaust oxygen sensor may not be possible due to the need to decrease load during the transmission shift (and humidity detection using the exhaust oxygen sensor may include opening the throttle to reduce PCV noise). Thus, if a transmission shift is predicted at 504, the method continues to 506 to determine the ambient humidity using an alternate method, as shown at FIG. 6.

Figure 6:
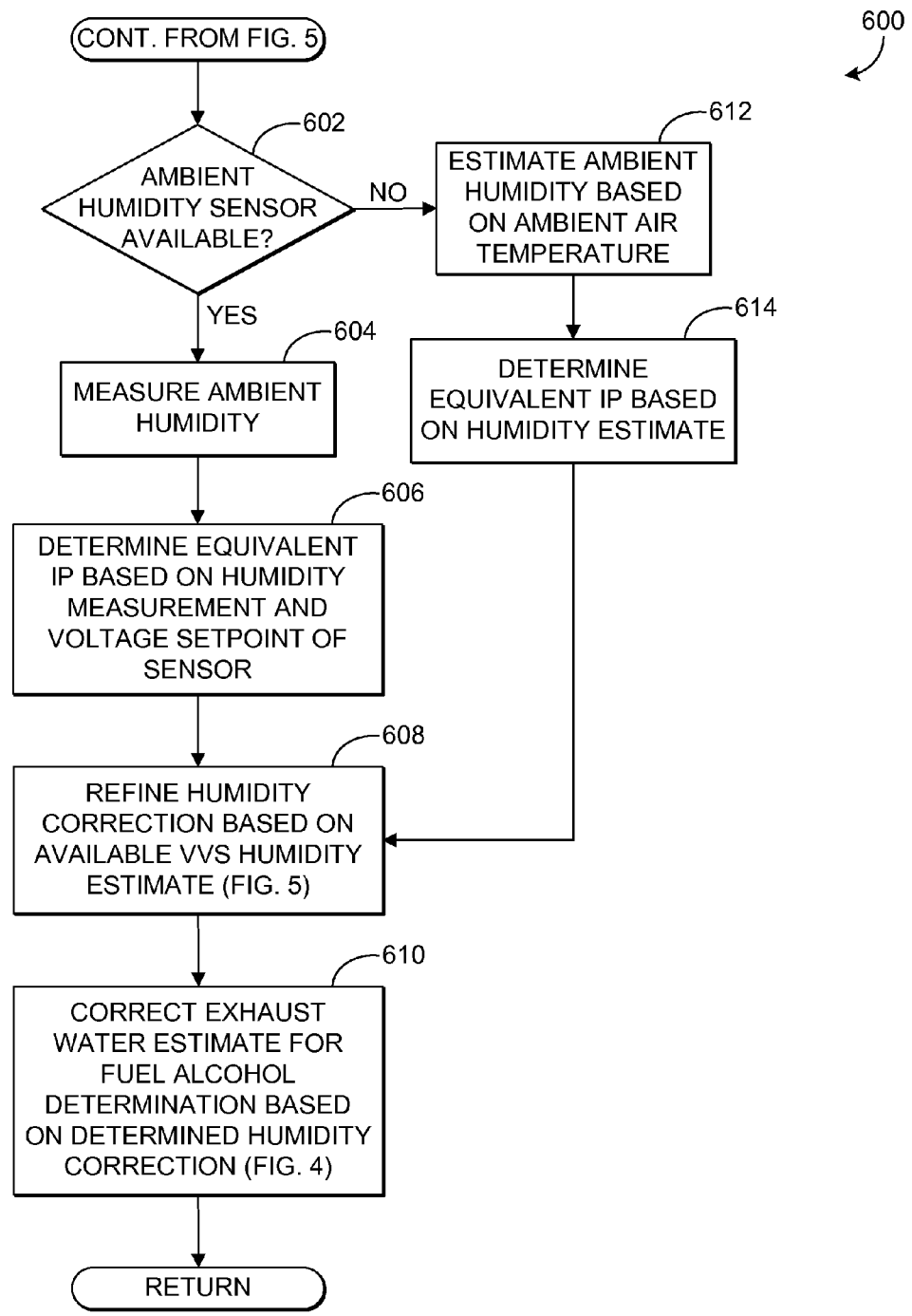

Continuing to FIG. 6 from 506, method 600 begins at 602 by determining if an ambient humidity sensor is available. For example, in one embodiment the engine may include a humidity sensor, such as humidity sensor 121 shown in FIG. 1, for directly measuring ambient humidity (e.g., measuring the humidity of the incoming intake air). If an ambient humidity sensor is present and available for use, the method continues to 604 to measure ambient humidity with the humidity sensor. At 606, the method includes determining an equivalent pumping current, Ip, for an oxygen sensor based on the humidity measurement and a current voltage set point of the exhaust oxygen sensor used for fuel alcohol determination in FIG. 4. For example, the output of the humidity sensor may be used as an input to a look-up table stored in a memory of the controller. The look-up table may relate humidity measurements (e.g., raw humidity measurements from the humidity sensor) and oxygen sensor voltage to pumping current. In one example, the resulting pumping current may be used as the humidity correction for the water estimate for fuel ethanol determination in FIG. 4. The method may then continue to 608 to refine the humidity correction determined at 606 based on an available variable voltage humidity estimate, as described further below with continued reference to FIG. 5. For example, humidity estimates using the variable voltage exhaust oxygen sensor during non-fueling conditions when a transmission shift is not expected may be stored in the memory of the controller and used to further refine the humidity correction. In alternate embodiments, method 600 may proceed directly from 606 to 610.

At 610, the method includes correcting the exhaust water estimate for fuel alcohol determination, at 431 of method 400, based on the determined humidity correction. For example, the method at 610 may be included as part of step 431 of method 400. As such, the method at 610 may include subtracting the equivalent pumping current determined at 606 (or refined at 608) from the change in pumping current measurement in method 400. In this way, ambient humidity may be subtracted from the estimate of total water in exhaust gas before determining the percentage of ethanol in the fuel.

Returning to 602, if an ambient humidity sensor is not available (e.g., the engine does not include a dedicated ambient humidity sensor), the method continues to 612 to estimate ambient humidity based on ambient air temperature. For example, ambient humidity may be estimated based on the ambient air temperature and a saturation vapor pressure estimated using an assumption of 50% relative humidity. Similarly to the method at 606, at 614, an equivalent pumping current may be determined based on the humidity estimate. The method than continues on to 608, as described above. Estimating ambient humidity based on ambient air temperature may not be as accurate as using a dedicated humidity sensor or the variable voltage exhaust oxygen sensor. As such, when possible, the controller may preferentially determine humidity based on outputs of the VVs exhaust oxygen sensor, as described further below.

Returning to FIG. 5, if there is not an incoming transmission shift predicted at 504, the method continues on to 508 to open the intake throttle (e.g., throttle 62 shown in FIG. 1) to further reduce the amount of hydrocarbons flowing past the exhaust oxygen sensor (e.g., exhaust oxygen sensor 126 shown in FIG. 1 and/or 200 shown in FIG. 2). For example, opening the throttle may reduce the amount of hydrocarbons from PCV coming through the exhaust. More specifically, if the intake throttle is closed during the engine non-fueling condition, a large intake manifold vacuum is generated which can draw in positive crankcase ventilation (PCV) hydrocarbons. As such, even if a PCV port is closed during the DFSO, the vacuum may be sufficiently strong to draw in PCV hydrocarbons through the piston rings. The PCV flow drawn in may be aggravated in an aging engine due to leakage of PCV gases past the piston rings and valves. The ingested hydrocarbons may affect the output of the exhaust gas oxygen sensor and can confound the humidity measurements. In particular, the hydrocarbon effect leads to a sensor output that overestimates the ambient humidity.

At 510, the method includes determining if the exhaust oxygen sensor should be operated in variable voltage (VVs) mode. As described above, VVs mode includes adjusting the reference voltage (also referred to herein as the pumping voltage) of the oxygen sensor from a lower, base voltage (e.g., approximately 450 mV) to a higher, target voltage where water molecules are dissociated at the sensor. In some examples, operating in VVs mode may include continuously modulating the reference voltage between the base voltage (e.g., first voltage) and the target voltage (e.g., second voltage). In some examples, continuously operating the oxygen sensor in VVs mode, and particularly at the higher, second voltage may degrade the sensor over time. Thus, it may be advantageous to reduce the amount of time the sensor spends operating in VVs mode. In one example, the sensor may only be operated in VVs mode if a duration has passed since a previous VVs operation period. In another example, the sensor may only be operated in VVs mode if a total duration of VVs mode operation for a period of engine use is below an upper threshold level. In yet another example, the sensor may operate in VVs mode based on a duration (e.g., amount of time elapsed) since a previous measurement. The sensor may also be turned off if a total threshold time has passed since a measurement. In another embodiment, continuously operating the oxygen sensor at the higher, second voltage may not degrade the sensor if the gas composition and second voltage are within certain threshold ranges that reduce degradation. In this embodiment, if the gas composition and second voltage of the sensor are maintained within their threshold ranges, the sensor may default to operating in VVs mode and the method may continue to 512.

If the controller determines that it is able operate the exhaust oxygen sensor in VVs mode, the method continues on to 512 to modulate the reference voltage of the exhaust oxygen sensor between the first voltage (V1) and the second voltage (V2). For example, the method at 512 includes first, at 514, applying the first voltage (V1) to the oxygen pumping cell of the exhaust gas sensor and a receiving the first pumping current (Ip1). The first reference voltage may have a value such that oxygen is pumped from the cell, but low enough that oxygen compounds such as H2O (e.g., water) are not dissociated (e.g., V1=approximately 450 mV). Application of the first voltage generates an output of the sensor in the form of the first pumping current (Ip1) that is indicative of the amount of oxygen in the sample gas. In this example, because the engine is under non-fueling conditions, the amount of oxygen may correspond to the amount of oxygen in the fresh air surrounding the vehicle. The method at 512 further includes, at 516, applying the second voltage (V2) to the oxygen pumping cell of the sensor and receiving a second pumping current (Ip2). The second voltage may be greater than the first voltage applied to the sensor. In particular, the second voltage may have a value high enough to dissociate a desired oxygen compound. For example, the second voltage may be high enough to dissociate H2O molecules into hydrogen and oxygen (e.g., V2=approximately 1.1 V). Application of the second voltage generates the second pumping current (I2) that is indicative of the amount of oxygen and water in the sample gas. It will be understood that the term "water" in the "amount of oxygen and water" as used herein refers to the amount of oxygen from the dissociated H2O molecules in the sample gas. In some examples, the first pumping current and the second pumping current may be corrected with a learned air-fuel ratio correction factor. For example, the learned air-fuel ratio correction may be determined at 720 of routine 700 described below with reference to FIG. 7.

The ambient humidity (e.g., absolute humidity of the fresh air surrounding the vehicle) may be determined at 518 of routine 500 based on the first pumping current and the second pumping current (or the correction first and second pumping current). For example, the first pumping current may be subtracted from the second pumping current to obtain a change in pumping current indicative of the amount of oxygen from dissociated water molecules (e.g., the amount of water) in the sample gas. This value may be proportional to the ambient humidity. The ambient humidity value may be used to correct the water estimate at 431 of method 400 and/or may be stored in the memory of the controller. In other examples, engine operation may be adjusted based on the determined ambient humidity.

Returning to 510, if operating the exhaust oxygen sensor in VVs mode is not desired, the method may instead include determining ambient humidity based on an output of the exhaust oxygen sensor at the first voltage and a dry air pumping current value. Specifically, the method at 520 includes determining a dry air pumping current. A method for determining a dry air pumping current of the exhaust oxygen sensor is presented at FIG. 8, described in further detail below. The method may include operating the exhaust oxygen sensor at a first, lower voltage to obtain a first output which indicates a humid air oxygen reading. The sensor may then be operated at a second, higher voltage to obtain a second output which indicates a humid air oxygen reading wherein all the humidity in the air has dissociated at the oxygen sensor. A middle voltage between the first, lower voltage and the second, higher voltage may produce an oxygen sensor output indicative of a dry air oxygen reading wherein partial dissociation of the humidity occurs. A dry air oxygen reading may then be estimated by a ratio between the first output and the second output. In this way, the dry air oxygen reading may be determined by operating the oxygen sensor in VVs mode. At 520, the controller may look up the most recently stored value of the dry air pumping current (determined by routine 800) to use at 520.

The method continues on to 522 to apply the first, lower reference voltage (e.g., base voltage, V1) to the exhaust oxygen sensor and a pumping current (IpB) is received. As such, the method at 522 includes not operating the oxygen sensor in VVs mode and instead maintaining the reference voltage of the sensor at a lower, base level that reduces oxygen sensor degradation. Said another way, the method at 522 includes not modulating the reference voltage of the oxygen sensor between a lower first voltage and a higher second voltage. The resulting pumping current may be indicative of the amount of oxygen in the sample gas.

The routine then continues on to 524 to determine ambient humidity based on IpB (the pumping current determined at 522 during non-VVs sensor operation) and the dry air pumping current determined during routine 800 (and looked up at 520). The amount of oxygen reduction due to the dilution effect of ambient humidity may then be determined based on the difference between the dry air pumping current and the pumping current IpB determined at 522. By multiplying by a conversion factor, this difference may then be converted from a pumping current to a humidity percentage. In this way, by comparing the output of the oxygen sensor operating in non-VVs mode at the base reference voltage to a stored dry air pumping current value, ambient humidity may be determined with continuously operating the oxygen sensor in VVs mode. The ambient humidity value determined at 524 may then be used to correct the water estimate at 431 of method 400 and/or may be stored in the memory of the controller. In other examples, engine operation may be adjusted based on the determined ambient humidity.

Figure 7:
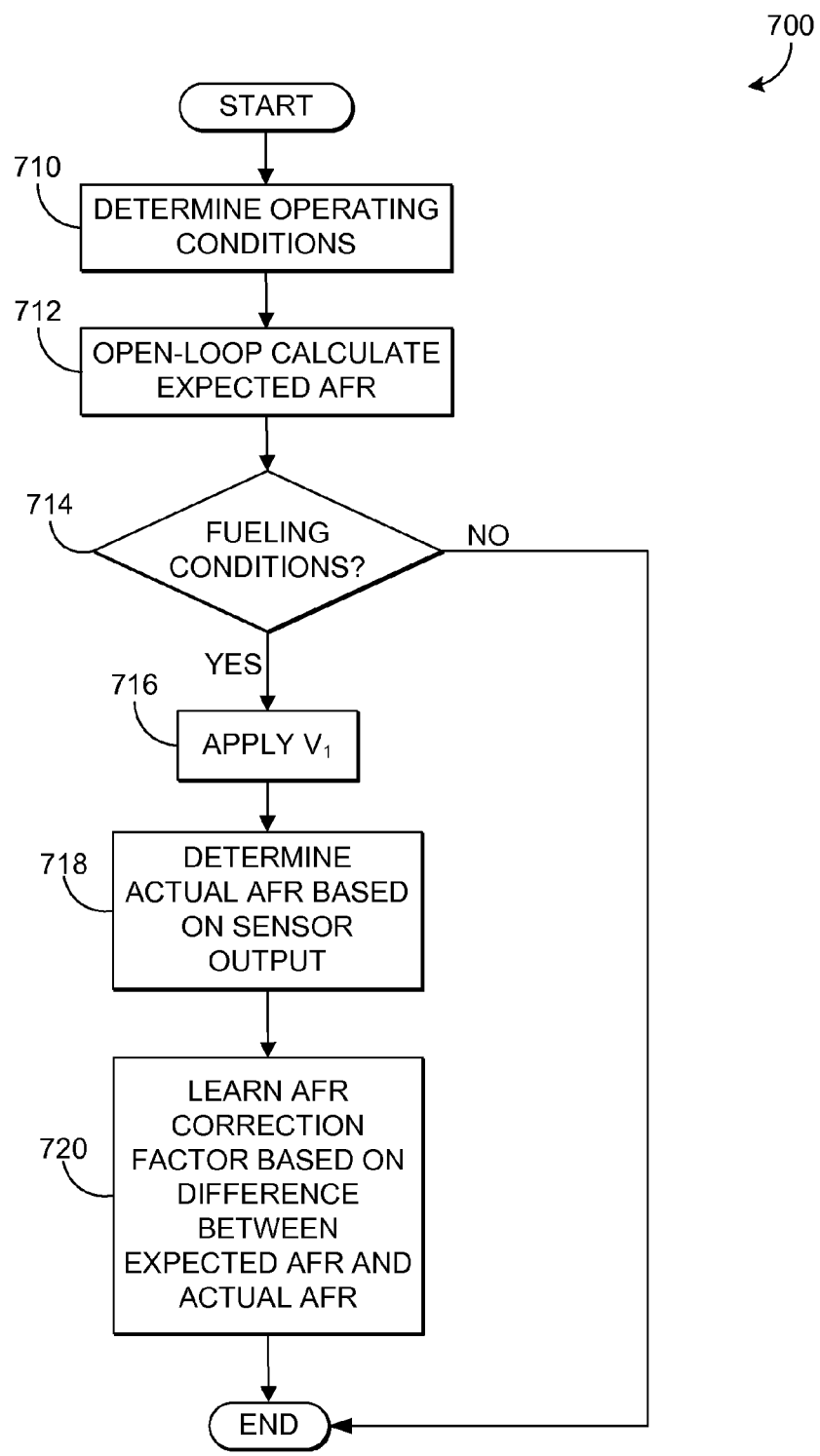
FIG. 7 shows a flow chart illustrating a routine for learning an air-fuel ratio correction factor.

Turning now to FIG. 7, a flow chart illustrating a routine 700 for learning an air-fuel ratio correction factor is shown. Specifically, routine 700 learns an error between an expected air-fuel ratio and an actual air-fuel ratio under engine fueling conditions. For example, the expected air-fuel ratio may be determined based on operating parameters, while the actual air-fuel ratio is determined based on output of an exhaust gas sensor, such as the universal exhaust gas oxygen sensor 200 described above with reference to FIG. 2. The air-fuel ratio correction learned during routine 700 may be used at 430 in routine 400 to correct pumping current outputs of the exhaust oxygen sensor, as described above with reference to FIG. 4.

At 710, engine operating conditions are determined. Engine operating conditions may include but are not limited to air-fuel ratio, amount of EGR entering the combustion chambers, and fueling conditions, for example.

Once the operating conditions are determined, routine 700 continues to 712 where the expected air-fuel ratio is calculated in open-loop manner. For example, the expected air-fuel ratio may be calculated based on operating parameters such as fuel injection and air flow amounts.

At 714, it is determined if the engine is under fueling conditions. For example, it may be determined that the engine is under fueling conditions if fuel is being delivered to at least one cylinder of the engine for combustion. If it is determined that the engine is not under fueling conditions (e.g., the engine is under non-fueling conditions), the routine ends.

On the other hand, if it is determined that the engine is under fueling conditions, the routine proceeds to 716 and a first pumping voltage (V1) is applied to the oxygen pumping cell of the exhaust gas sensor. Application of the first voltage generates an output of the sensor in the form of a first pumping current that is indicative of an amount of oxygen in the sample gas. In this example, because fuel is injected to the engine and combustion is carried out, the first pumping current may be indicative of an amount of oxygen in the exhaust gas. Thus, at 718, the actual air-fuel ratio is determined based on the sensor output (e.g., responsive to application the first pumping voltage).

Once the actual air-fuel ratio is determined, the correction factor is learned at 720 based on a difference between the expected air-fuel ratio (determined at 712) and the actual air-fuel ratio (determined at 718).

In this manner, the air-fuel ratio correction factor may be determined. As such, estimation of exhaust water content and fuel alcohol content may be accurately determined, as described in detail with reference to FIG. 4 above, without requiring the air-fuel ratio to be accurately controlled to a target value.

Figure 8:
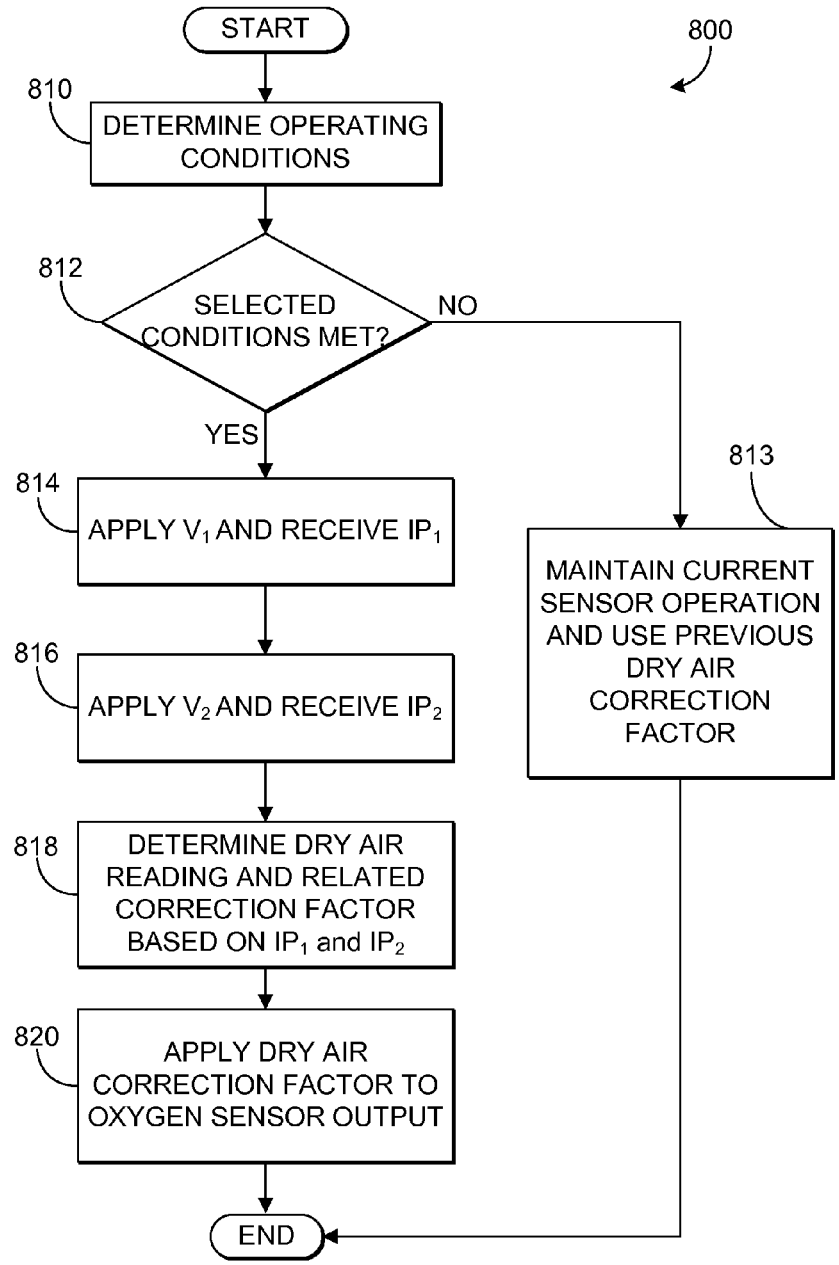
FIG. 8 shows a flow chart illustrating a routine for estimating a dry air pumping current with an oxygen sensor.

Turning now to FIG. 8, a flow chart illustrating a routine 800 for determining a dry air oxygen reading with an oxygen sensor, such as the oxygen sensor 200 described above with reference to FIG. 2, is shown. Specifically, the routine 800 determines a dry air oxygen reading based on different voltages (e.g., reference voltages) applied to a pumping cell of the oxygen sensor during selected engine operating conditions. The resulting dry air oxygen reading may then be used along with subsequent oxygen sensor outputs during additional select operating conditions to estimate ambient humidity, as described above with reference to FIG. 5.

At 810 of routine 800, engine operating conditions are determined. Engine operating conditions may include but are not limited to air-fuel ratio, amount of EGR entering the combustion chambers, and fueling conditions, for example.

Once the engine operating conditions are determined, routine 800 continues to 812 where it is determined if selected conditions are met. For example, the selected conditions may include engine non-fueling conditions. Non-fueling conditions include vehicle deceleration conditions and engine operating conditions in which the fuel supply is interrupted but the engine continues spinning and at least one intake valve and one exhaust valve are operating; thus, air is flowing through one or more of the cylinders, but fuel is not injected in the cylinders. Under non-fueling conditions, combustion is not carried out and ambient air may move through the cylinder from the intake to the exhaust. In this way, a sensor, such as an exhaust oxygen sensor, may receive ambient air on which measurements, such as ambient humidity detection, may be performed.

As noted, non-fueling conditions may include, for example, deceleration fuel shut-off (DFSO). DFSO is responsive to the operator pedal (e.g., in response to a driver tip-out and where the vehicle decelerates greater than a threshold amount or a duration without operator pedal application). DSFO conditions may occur repeatedly during a drive cycle, and, thus, numerous indications of the ambient humidity may be generated throughout the drive cycle, such as during each DFSO event. As such, the fuel type may be identified accurately based on an amount of water in the exhaust gas despite fluctuations in humidity between drive cycles or even during the same drive cycle.

Further, the selected conditions at 812 may additionally include following an engine start or a duration of engine operation (e.g., a number of travel miles, an amount of time, or a number of engine cycles). For example, the selected conditions at 812 may include following an engine start (or after a duration of engine operation) during engine non-fueling conditions (e.g., when fueling is disabled as described above). In this way, learning the dry air oxygen reading as described further below may only occur periodically after each engine start or after a duration of engine operation when the flow of hydrocarbons past the oxygen sensor are reduced. In this way, a more accurate sensor reading may be obtained while reducing an amount of time of operating the oxygen sensor in VVs mode.

Continuing with FIG. 8, if it is determined that the selected operating conditions are not met, the routine 800 continues to 813 to continue current oxygen sensor operation (at the current pumping voltage, such as at the base or lower, first reference voltage) and determine ambient humidity based on a previously determined dry air pumping current (e.g., dry air oxygen reading). As such, the method at 524 in FIG. 5 may include determining ambient humidity using a previously stored dry air oxygen reading from a previous dry air oxygen reading learning routine. For example, following each execution of routine 800 where a dry air oxygen reading is determined, the resulting dry air oxygen reading (e.g., pumping current) value may be stored in a memory of the controller. Then, during the routine of FIG. 5, the most recently stored dry air pumping current may be looked up in the memory of the controller and used to determine ambient humidity. The method at 813 may include not operating the oxygen sensor in the VVs mode and instead continuing to operate the oxygen sensor at the lower, first reference voltage, also referred to herein as the base reference voltage. Operating the oxygen sensor at the base reference voltage may result in less sensor degradation than when operating the oxygen sensor at the higher, second reference voltage.

Conversely at 812, if is determined that selected operating conditions are met, routine 800 continues to 814 where a first pumping voltage (V1) (e.g., first reference voltage) is applied to the oxygen pumping cell of the oxygen sensor and a first pumping current (Ip1) is received. The first pumping voltage may have a value such that oxygen is pumped from the cell, but low enough that oxygen compounds such as H2O (e.g., water) are not dissociated (e.g., V1=approximately 450 mV). For example, at the first pumping voltage, the oxygen sensor may not dissociate any water molecules. Application of the first voltage generates an output of the sensor in the form of the first pumping current (Ip1) that is indicative of the amount of oxygen in the sample gas. In this example, because the engine is under selected conditions (such as non-fueling conditions), the amount of oxygen may correspond to the amount of oxygen in the fresh air surrounding the vehicle, or a humid air oxygen reading.

Once the amount of oxygen is determined, routine 800 proceeds to 816 where a second pumping voltage (V2) (e.g., reference voltage) is applied to the oxygen pumping cell of the oxygen sensor and a second pumping (Ip2) current is received. The second voltage may be greater than the first voltage applied to the sensor. In particular, the second voltage may have a value high enough to dissociate a desired oxygen compound. For example, the second voltage may be high enough to dissociate all H2O molecules into hydrogen and oxygen (e.g., V2=approximately 1.1 V). Application of the second voltage generates the second pumping current (I2) that is indicative of the amount of oxygen and water in the sample gas. It will be understood that the term "water" in the "amount of oxygen and water" as used herein refers to the amount of oxygen from the dissociated H2O molecules in the sample gas.

In one particular example, the second voltage (e.g., second reference voltage) may be 1080 mV, at which the water in the air is fully (e.g., completely) dissociated (e.g., 100% of the water in the air is dissociated at 1080 mV). This second voltage may be larger than a third, middle voltage where water in the air is partially dissociated (e.g., approximately 40% of the water in the air is dissociated). In one example, the third, middle voltage may be about 920 mV. In another example, the third, middle voltage may be about 950 mV. As an example, the sensor output at 920 mV may correspond to a dry air reading under a range of humidity conditions. The sensor output at 1.1 V may correspond to a humid air reading where all the water in the air has been dissociated at the sensor and the sensor output at 450 mV may correspond to a humid air reading where no water in the air has been dissociated. Thus, a dry air oxygen reading may be obtained by a ratio of oxygen sensor outputs when the oxygen sensor is operated at 450 mV and 1.1V. In an alternate embodiment, the dry air oxygen reading may be obtained by a ratio of oxygen sensor output when the oxygen sensor is operated at a voltage below 0.92 V where water is not dissociated (e.g., not even partially dissociated) and a voltage above 0.92 V where water is fully dissociated (e.g., 100% dissociated).

At 818, the dry air oxygen reading and related correction factor are determined based on the first pumping current and the second pumping current. For example, as described above, by operating the sensor at 450 mV (or a similar voltage where no water is dissociated at the sensor), a lower pumping current and oxygen reading may be obtained and by operating the sensor at 1080 mV (or a similar voltage where all water is dissociated at the sensor) a higher pumping current and oxygen reading may be obtained. A dry air pumping current indicative of a dry air oxygen reading may then be estimated from a ratio between the lower, first pumping current and the higher, second pumping current. For example, a sum of 40% of the higher, second pumping current and 60% of the lower, first pumping current may be substantially equal to the dry air pumping current and oxygen reading. In an alternate example, different percentages of the higher and lower pumping current may be added together to determine the dry air pumping current. For example, if the higher or lower voltage differ from 450 mV and 1080 mV, respectively, the corresponding percentages used to determine the ratio between the higher and lower pumping currents may differ proportionally.

The estimated dry air oxygen reading based on the ratio between the higher and lower pumping currents (e.g., higher and lower oxygen sensor outputs corresponding to the higher and lower voltages) may then be used to determine an ambient humidity estimate at 820, as described above with reference to FIG. 5. For example, the method at 820 may include storing the determined dry air oxygen reading (e.g., as a dry air pumping current value) in a memory of the controller. Then, during the routine of FIG. 5 (e.g., at steps 520-524), the controller may look-up the most recently stored dry air oxygen reading and comparing it to another oxygen sensor output under select engine operating conditions to determine the ambient humidity estimate. Further, the method at 820 may include updating a previously stored dry air oxygen reading with a new dry air oxygen reading in the memory of the controller. For example, the stored dry air oxygen reading may be updated following each engine start.

Figure 9:
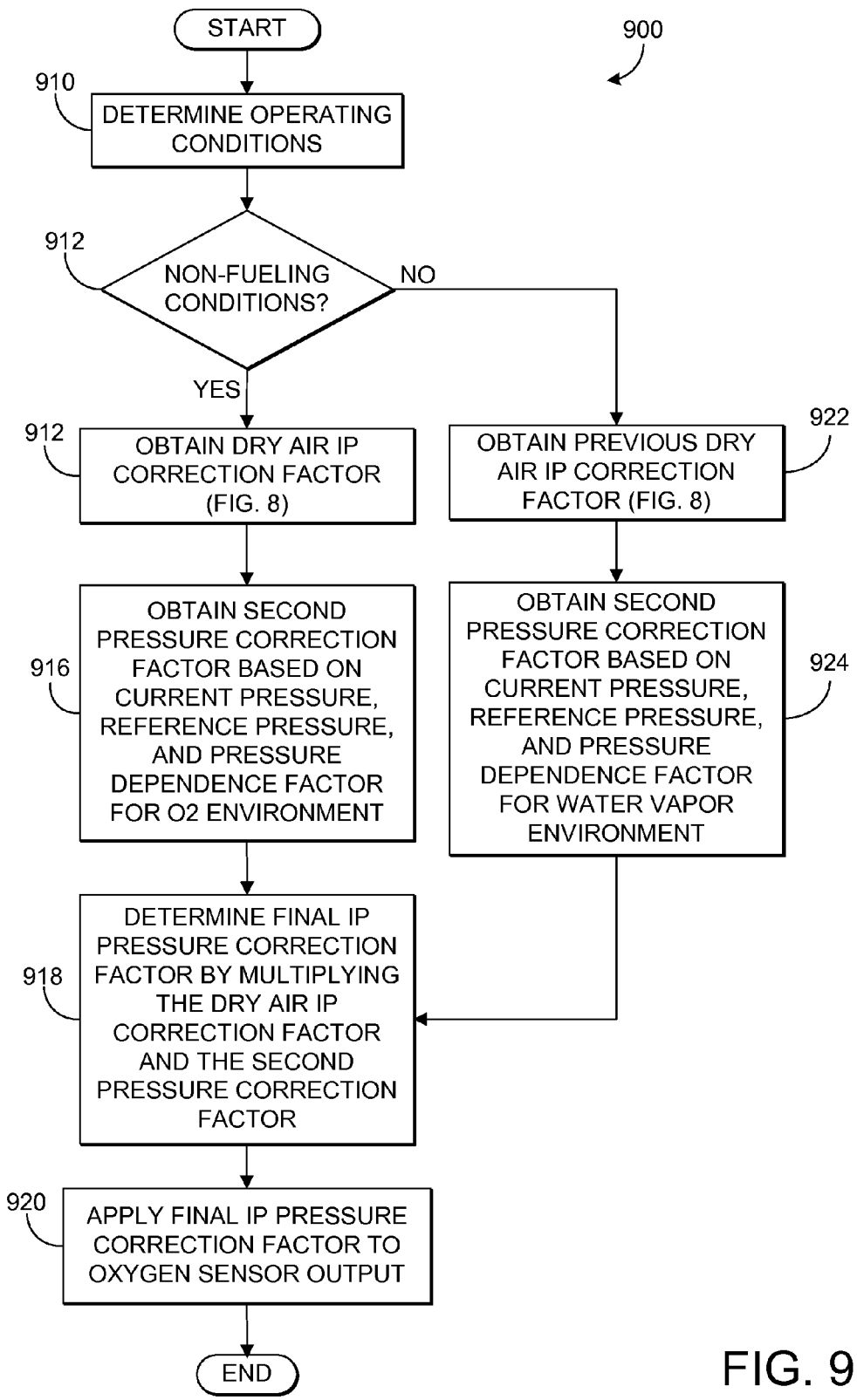
FIG. 9 shows a flow chart illustrating a routine for determining a pressure correction factor for an exhaust oxygen sensor.
Figure 10:
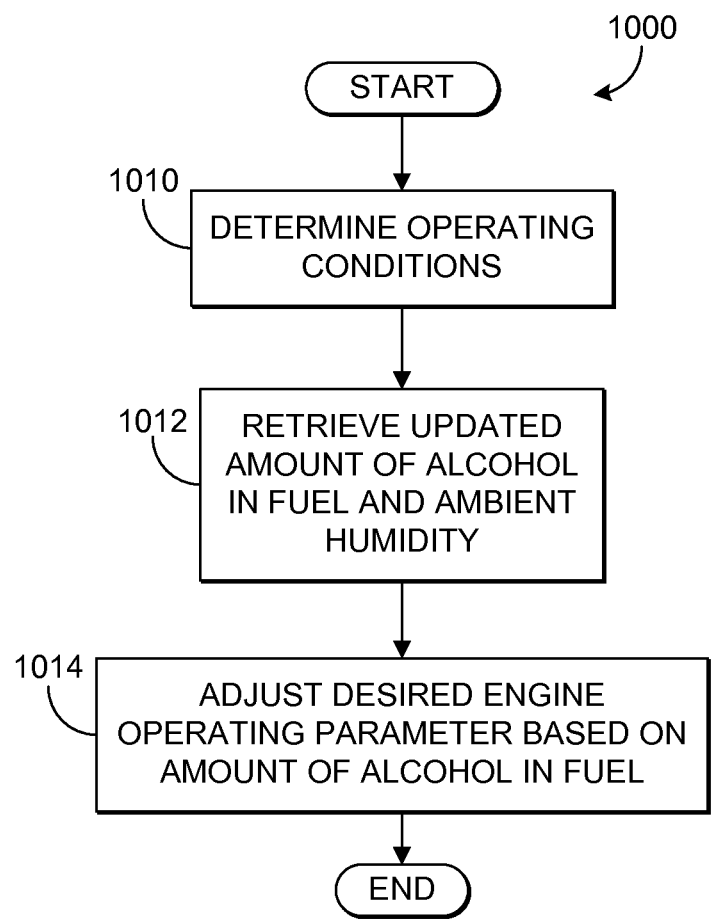
FIG. 10 shows a flow chart illustrating a routine for controlling an engine based on an exhaust oxygen sensor.

Turning to FIG. 9, a method 900 is shown for determining a pressure correction factor for an exhaust oxygen sensor output. Oxygen sensors may have a pressure dependency which may impact the diffusion properties of the sensing element, thereby resulting in a gain error in the sensor's output pumping current (Ip). This may be a significant noise factor for variable voltage (VVs) measurements and may also impact the air-fuel controller when operating in non-VVs mode. As a result, fuel economy, emissions, and drivability may all be degraded. Additionally, this may result in reduced accuracy of exhaust water content estimates used to determine the amount of alcohol in the fuel, as described above with reference to FIG. 4. As introduced above, the pumping current outputs of the exhaust oxygen sensor may be corrected based on various correction factors, including a pressure correction factor (as shown at step 430 in FIG. 4). The resulting corrected pumping current outputs may then be used to determine a more accurate fuel ethanol content estimate. The dry air pumping current correction determined in method 800 may provide compensation for the oxygen sensor's total gain error, including part-to-part variability, aging, and pressure. However, the dry air pumping current learning routine (as shown in FIG. 8) is performed during non-fueling conditions (e.g., DFSO events) which is a relatively high oxygen environment. However, fuel ethanol estimates are performed during combustion and thus fueling conditions which is a relatively high water vapor environment. However, the pressure dependencies of the exhaust oxygen sensor is different in these two different environments. Thus, an error may result in the dry air pumping current correction is applied during both conditions.

Instead, pressure correction curves defining a relationship between a measured pressure and a pressure correction factor for the exhaust oxygen sensor for each water vapor environment (e.g., fueling and non-fueling) may be utilized. These relationships may each be based on a different pressure dependence factor (e.g., k-factor). For example, a pressure correction for the water vapor environment of the exhaust oxygen sensor may be determined based on the following relationship:

$$\text{Pressure correction}_{wv} = ((k\text{-factor} + P_{meas})/P_{meas}) * (P_{ref}/(k\text{-factor} + P_{ref})), \quad \text{(Equation 1)}$$

where $P_{meas}$ is a current barometric pressure measurement determined from a barometric pressure sensor of the engine, $P_{ref}$ is a selected reference pressure (e.g., reference pressure at sea level), and the k-factor is a pre-set pressure dependence factor for either a higher water vapor environment (e.g., fueling condition) or a higher oxygen environment (e.g., non-fueling condition). In another embodiment, $P_{meas}$ may be a modeled value based on additional operating parameters. The pre-set k-factors may be pre-determined during oxygen sensor testing and then stored in the memory of the engine controller. For example, the k-factors may be set to a known sensor average for a group of oxygen sensors. In another example, the k-factors may be learned on the vehicle during vehicle use. In yet another example, the k-factors for the water and oxygen environments may have substantially the same value.

A total pressure compensation (e.g., total pressure correction factor) may then be determined based on the k-factor relationships and the dry air pumping current correction factor learned during method 800. For example, the resulting final pressure corrected pumping current outputs for the exhaust oxygen sensor may be:

$$\text{Final pressure corrected } Ip(\text{non-fueling}) = Ip_{meas} * \text{Dry air correction factor} * \text{Pressure correction}_{wv}(k\text{-factor\_O2}, P_{meas}), \quad \text{(Equation 2)}$$

$$\text{Final pressure corrected } Ip(\text{fueling}) = Ip_{meas} * \text{Dry air correction factor} * \text{Pressure correction}_{wv}(k\text{-factor\_H2O}, P_{meas}), \quad \text{(Equation 3)}$$

where $Ip_{meas}$ is the pumping current output from the exhaust oxygen sensor, the dry air correction factor is the correction factor learned during method 800, Pressure correction$_{wv}$ (k-factor_O2, $P_{meas}$) is the pressure correction factor for a higher oxygen environment (e.g., lower water vapor environment and non-fueling conditions) which is based on the oxygen environment k-factor and measured barometric pressure, and Pressure correction$_{wv}$ (k-factor_H2O, $P_{meas}$) is the pressure correction factor for a higher water vapor environment (e.g., fueling conditions) which is based on the water environment k-factor and the measured barometric pressure. In this way, the output of the exhaust oxygen sensor may be corrected based on a current measured pressure, a dry air correction factor, and a pressure dependence factor based on the water vapor environment around the exhaust oxygen sensor.

Turning to method 900, the method begins at 910 by determining operating conditions. Operating conditions may include air-fuel ratio, engine speed and/or load, ambient temperature, barometric pressure, fuel injection amount, etc.

At 912, the method includes determining if non-fueling conditions are present. If the engine is not currently being fueled (e.g., fuel is not being injected into any of the engine cylinders), the method continues on to 912 to obtain the dry air pumping current correction factor. For example, the method at 912 may include executing method 800 shown in FIG. 8, as described above. In another example, the method at 912 may including looking up the most recently determined and stored dry air pumping current determined during method 800 in the memory of the controller. After obtaining the dry air pumping current correction factor, the method continues on to 916 to obtain a second pressure correction factor based on the current pressure, a reference pressure, and a pressure dependence factor (e.g., k-factor) for a higher oxygen environment. The method of 916 may include determining the pressure correction factor for a higher oxygen environment, as shown by Equation 1 above. The method then continues on to 918 to determine the final pumping current pressure correction factor by multiplying the dry air pumping current correction factor determined at 912 by the second pressure correction factor determined at 916. At 920, the method includes applying the final pumping current pressure correction factor to the oxygen sensor output. For example, the method at 920 may include inputting the pumping currents measured at steps 426 and 428 of method 400 into equation 3 shown above. The resulting pressure-corrected pumping current determined at 920 (and thus at step 430 in method 400) may then be used in method 400 to determine a more accurate fuel ethanol content estimate.

Returning to 912, if the engine is currently fueling (e.g., fuel is being injected into one or more engine cylinder), the method proceeds to 922 to obtain a previously determined dry air pumping current correction factor. For example, the method at 922 may include looking up in the memory of the controller a most recently stored dry air pumping current correction factor determined during the last execution of method 800. The method then continues to 924 to obtain a second pressure correction factor based on the current pressure, a reference pressure, and a pressure dependence factor (e.g., k-factor) for a higher water vapor environment. The method at 924 may include determining the pressure correction factor for a higher water environment, as shown by Equation 2 above. The method then continues on to 918 and 920, as described above to determine and apply the final pumping current pressure correction factor to the exhaust oxygen sensor output.

Referring now to FIG. 10, a flow chart depicting a general control routine 1000 for adjusting engine operating parameters based on an amount of alcohol in fuel injected to the engine is shown (also referred to herein as fuel alcohol content or fuel ethanol content). Specifically, one or more engine operating parameters may be adjusted corresponding to a change in the amount of alcohol in the fuel. For example, fuels containing different amount of alcohol may have different properties such as viscosity, octane number, latent enthalpy of vaporization, etc. As such, engine performance, fuel economy, and/or emissions may be degraded if one or more appropriate operating parameters are not adjusted.

At 1010 of routine 1000, engine operating conditions are determined. Engine operating conditions may include, for example, air-fuel ratio, fuel injection timing, and spark timing. For example, the ratio of air to fuel which is stoichiometric may vary for varying types (e.g., 14.7 for gasoline, 9.76 for E85) and fuel injection timing and spark timing may need to be adjusted based on the fuel type.

Once the operating conditions are determined, an updated amount of alcohol in the fuel mixture and the ambient humidity are determined at 1012 of routine 1000. After the fuel alcohol content is known, routine 1000 proceeds to 1014 where, under selected operating conditions such as cold start or transient fueling conditions, one or more desired operating parameters are adjusted based on the amount of alcohol in the fuel. For example, the system may adjust the stoichiometric air-fuel ratio based on the amount of alcohol in the fuel. Further, feedback air-fuel ratio control gains may be adjusted based on the amount of alcohol in the fuel. Further still, the desired air-fuel ratio during cold starting may be adjusted based on the amount of alcohol in the fuel. Further still, spark angle (such as spark retard) and/or boost levels may be adjusted based on the amount of alcohol in the fuel.

In some embodiments, for example, the timing and/or amount of the fuel injection in one or more cylinders may be adjusted. For example, if it is determined that the amount of alcohol in the fuel is increased (e.g., from 10% ethanol to 30% ethanol) during cold start conditions, the amount of fuel injected to the engine may be increased.

As another example, spark timing may be adjusted based on the detected amount of alcohol in the fuel. For example, if the detected percentage of alcohol is lower than previously detected (e.g., from 85% ethanol to 50% ethanol), the spark timing may be retarded in order to achieve a higher engine output or boost without knock.

Thus, various engine operating parameters may be adjusted during selected operating conditions based on a detected amount of alcohol in the fuel injected to the cylinders of the engine. In this manner, engine and/or emissions efficiency as well as fuel economy may be maintained or improved.

In this way, by comparing two different fuel alcohol content estimates determined with an exhaust oxygen sensor, the most accurate fuel alcohol content estimate may be selected and used for engine control. As described above, a first fuel alcohol estimate may be determined based on an air-fuel ratio determined from the sensor when the exhaust oxygen sensor is operating at a lower, first voltage (e.g., operating as a traditional air-fuel sensor) following a re-fueling event. As such, the first fuel alcohol estimate may be updated each time there is a re-fueling event so that a more accurate estimate of the amount of alcohol in the fuel is learned. Then, a second fuel alcohol estimate may be determined during engine fueling conditions by modulating the exhaust oxygen sensor between the first voltage and a second, higher voltage (e.g., the second voltage may be a voltage at which water molecules are dissociate at the sensor) and determining a change in pumping current during the modulating. The change in pumping current may then be corrected for various factors including humidity, pressure, and air-fuel ratio. This may further increase the accuracy of the second fuel alcohol estimate which is based on the corrected change in pumping current. In one example, the second fuel alcohol estimate may only be determined when the engine temperature has increased above a threshold while the first fuel alcohol estimate may be determined when the engine temperature is below the threshold, such as during a cold start. As such, determining the first fuel alcohol estimate may occur before determining the second fuel alcohol estimate. If the difference between the first and second fuel alcohol content estimates are greater than a threshold error, the controller may not adjust engine operation based on the first fuel alcohol estimate and may instead adjust engine operation based on the second fuel alcohol estimate or repeat the second fuel alcohol estimate and compare the first with the updated second fuel alcohol estimate. Otherwise, if the difference between the two fuel alcohol estimates is less than the threshold, the controller may adjust engine operation based on the first and not the second fuel alcohol estimate. As such, a technical effect of estimating the first fuel alcohol estimate and the second fuel alcohol estimate and adjusting engine operation based on an error between the first and second fuel alcohol content estimates is increasing an accuracy of the fuel alcohol content estimate used for engine control and thereby increasing fuel efficiency and improving overall engine control.

As one embodiment, a method comprises: estimating a first fuel alcohol content based on an air-fuel ratio estimated with an exhaust oxygen sensor; after an engine temperature increases above a threshold, estimating a second fuel alcohol content based on a change in sensor output during modulating a reference voltage of the exhaust oxygen sensor between a first and second voltage; and adjusting engine operation based on a difference between the first and second fuel alcohol contents. The method may further comprise in response to the difference between the first and second fuel alcohol contents being greater than a threshold level, modulating the reference voltage of the exhaust oxygen sensor between the first and second voltage and repeating the estimating the second fuel alcohol content to determine a new second fuel alcohol content. The method further comprises in response to a difference between the first fuel alcohol content and the new second fuel alcohol content being greater than the threshold level, adjusting engine operation based on the second fuel alcohol content and not the first fuel alcohol content. Alternatively, the method comprises in response to the difference between the first and second fuel alcohol contents being less than the threshold level or the difference between the first fuel alcohol content and the new second fuel alcohol content being less than the threshold level, adjusting engine operation based on the first fuel alcohol content and not the second fuel alcohol content. For example, the first voltage is a lower, base voltage where water molecules are not dissociated at the exhaust oxygen sensor and the second voltage is a higher, target voltage where water molecules are dissociated at the exhaust oxygen sensor. Additionally, the first and second fuel alcohol contents are first and second amounts of alcohol in fuel injected into engine cylinders.

As one example, the modulating includes alternating between applying the first voltage and the second voltage to the exhaust oxygen sensor and estimating the second fuel alcohol content includes averaging a change in pumping current output by the exhaust oxygen sensor during the modulating. In another example, the estimating the first fuel alcohol content is performed following a re-fueling event and includes operating the exhaust oxygen sensor at the first voltage, determining the air-fuel ratio based on a pumping current output by the exhaust oxygen sensor while operating at the first voltage, determining the first fuel alcohol content based on the determined air-fuel ratio, and updating a previous first fuel alcohol content determined prior to the re-fueling event with the first fuel alcohol content determined following the re-fueling event.

Additionally, estimating the second fuel alcohol content may be performed after the engine temperature increases above the threshold and during engine fueling conditions and includes operating the exhaust oxygen sensor in a variable voltage mode by alternating between applying the first voltage and the second voltage to the exhaust oxygen sensor. The method may further comprise correcting sensor outputs at the first voltage and second voltage based on one or more of an air-fuel ratio correction factor and a total pressure correction factor, where the air-fuel ratio correction factor is based on a difference between an expected air-fuel ratio open-loop calculated based on fuel injection and air flow amounts and an actual air-fuel ratio measured based on an output of the exhaust oxygen sensor upon applying the first voltage during engine fueling conditions. For example, the method may further include during engine non-fueling conditions applying each of the first voltage and the second voltage to the exhaust oxygen sensor, the first voltage being a voltage where water molecules are not dissociated and the second voltage being a voltage where water molecules are fully dissociated, and learning a first pressure correction factor for the exhaust oxygen sensor based on a ratio of first and second outputs generated upon applying the first and second voltages, respectively; learning a second pressure correction factor based on a current barometric pressure and a pressure dependence factor based on a water vapor environment of the exhaust oxygen sensor; and determining the total pressure correction factor by multiplying the first pressure correction factor by the second pressure correction factor.

The method may further comprise correcting the change in sensor output during the modulating based on ambient humidity. In one example, the method may include during unfueled engine operation when a transmission shift is not predicted, opening an intake throttle and sequentially applying each of the first and second voltage to the exhaust oxygen sensor and estimating an ambient humidity based on a change in pumping current output by the exhaust oxygen sensor between applying each of the first and second voltage. In another example, the method may include during unfueled engine operation when a transmission shift is not predicted, opening an intake throttle and applying the first voltage to the exhaust oxygen sensor and estimating ambient humidity based on a pumping current output by the exhaust oxygen sensor upon applying the first voltage and based on a dry air pumping current. In yet another example, the method may include when a transmission shift is predicted, estimating ambient humidity based on one of an output of an ambient humidity sensor or based on an ambient air temperature.

As another embodiment, a method for an engine comprises: during a first condition following a re-fueling event, estimating an air-fuel ratio based on an output of an exhaust oxygen sensor operating at a lower first voltage and determining a first fuel ethanol content estimate based on the air-fuel ratio; after an engine temperature increases above a threshold while the engine is fueling, determining a second fuel ethanol content estimate based on a change in sensor output when modulating a reference voltage of the exhaust oxygen sensor between the first voltage and a higher second voltage; and adjusting an engine operating parameter based on an error between the first and second fuel ethanol content estimates.

In one example, the first condition includes a cold start and the error includes a difference between the first and second fuel ethanol content estimates. The method may further comprise: during a first condition when the error is less than a threshold, adjusting the engine operating parameter based on the first fuel ethanol content estimate and during a second condition when the error is greater than the threshold, repeating the determining the second fuel ethanol content estimate to determine an updated second fuel ethanol content estimate. Then, if the error between the first fuel ethanol content estimate and the updated second fuel ethanol content estimate remains above the threshold, the method may include adjusting the engine operating parameter based on one of the second fuel ethanol content estimate or the updated second fuel ethanol content estimate. Otherwise, if the error between the first fuel ethanol content estimate and the updated second fuel ethanol content estimate is not greater than the threshold, the method may include adjusting the engine operating parameter based on the first fuel ethanol content estimate. As one example, the engine operating parameter includes one or more of a fuel injection amount and spark timing. The method may further comprise adjusting the change in sensor output when modulating the reference voltage based on one or more of a first pressure correction factor based on a dry air pumping current of the exhaust oxygen sensor, a second pressure correction factor based on a water vapor environment of the exhaust oxygen sensor, an air-fuel ratio correction factor based on an measured and expected air-fuel ratio, and an ambient humidity.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   estimating a first fuel alcohol content based on an air-fuel ratio estimated with an exhaust oxygen sensor;
   after an engine temperature increases above a threshold, estimating a second fuel alcohol content based on a change in sensor output during modulating a reference voltage of the exhaust oxygen sensor between a first and second voltage; and
   adjusting engine operation based on a difference between the first and second fuel alcohol contents.

2. The method of claim 1, further comprising in response to the difference between the first and second fuel alcohol contents being greater than a threshold level, modulating the reference voltage of the exhaust oxygen sensor between the first and second voltage and repeating the estimating the second fuel alcohol content to determine a new second fuel alcohol content.

3. The method of claim 2, further comprising in response to a difference between the first fuel alcohol content and the new second fuel alcohol content being greater than the threshold level, adjusting engine operation based on the second fuel alcohol content and not the first fuel alcohol content.

4. The method of claim 2, further comprising in response to the difference between the first and second fuel alcohol contents being less than the threshold level or the difference between the first fuel alcohol content and the new second fuel alcohol content being less than the threshold level, adjusting engine operation based on the first fuel alcohol content and not the second fuel alcohol content.

5. The method of claim 1, wherein the modulating includes alternating between applying the first voltage and the second voltage to the exhaust oxygen sensor and wherein estimating the second fuel alcohol content includes averaging a change in pumping current output by the exhaust oxygen sensor during the modulating.

6. The method of claim 1, wherein the estimating the first fuel alcohol content is performed following a re-fueling event and includes operating the exhaust oxygen sensor at the first voltage, determining the air-fuel ratio based on a pumping current output by the exhaust oxygen sensor while operating at the first voltage, determining the first fuel alcohol content based on the determined air-fuel ratio, and updating a previous first fuel alcohol content determined prior to the re-fueling event with the first fuel alcohol content determined following the re-fueling event.

7. The method of claim 1, wherein estimating the second fuel alcohol content is performed after the engine temperature increases above the threshold and during engine fueling conditions and includes operating the exhaust oxygen sensor in a variable voltage mode by alternating between applying the first voltage and the second voltage to the exhaust oxygen sensor.

8. The method of claim 7, further comprising correcting sensor outputs at the first voltage and second voltage based on one or more of an air-fuel ratio correction factor and a total pressure correction factor, wherein the air-fuel ratio correction factor is based on a difference between an expected air-fuel ratio open-loop calculated based on fuel injection and air flow amounts and an actual air-fuel ratio measured based on an output of the exhaust oxygen sensor upon applying the first voltage during engine fueling conditions.

9. The method of claim 8, further comprising:

during engine non-fueling conditions applying each of the first voltage and the second voltage to the exhaust oxygen sensor, the first voltage being a voltage where water molecules are not dissociated and the second voltage being a voltage where water molecules are fully dissociated, and learning a first pressure correction factor for the exhaust oxygen sensor based on a ratio of first and second outputs generated upon applying the first and second voltages, respectively;

learning a second pressure correction factor based on a current barometric pressure and a pressure dependence factor based on a water vapor environment of the exhaust oxygen sensor; and determining the total pressure correction factor by multiplying the first pressure correction factor by the second pressure correction factor.

10. The method of claim 7, further comprising correcting the change in sensor output during the modulating based on ambient humidity.

11. The method of claim 10, further comprising during unfueled engine operation when a transmission shift is not predicted, opening an intake throttle and sequentially applying each of the first and second voltage to the exhaust oxygen sensor and estimating an ambient humidity based on a change in pumping current output by the exhaust oxygen sensor between applying each of the first and second voltage.

12. The method of claim 10, further comprising during unfueled engine operation when a transmission shift is not predicted, opening an intake throttle and applying the first voltage to the exhaust oxygen sensor and estimating ambient humidity based on a pumping current output by the exhaust oxygen sensor upon applying the first voltage and based on a dry air pumping current.

13. The method of claim 10, further comprising when a transmission shift is predicted, estimating ambient humidity based on one of an output of an ambient humidity sensor or based on an ambient air temperature.

14. The method of claim 1 where the first voltage is a lower, base voltage where water molecules are not dissociated at the exhaust oxygen sensor and the second voltage is a higher, target voltage where water molecules are dissociated at the exhaust oxygen sensor and wherein the first and second fuel alcohol contents are first and second amounts of alcohol in fuel injected into engine cylinders.

15. A method for an engine, comprising:

during a first condition following a re-fueling event, estimating an air-fuel ratio based on an output of an exhaust oxygen sensor operating at a lower first voltage and determining a first fuel ethanol content estimate based on the air-fuel ratio;

after an engine temperature increases above a threshold while the engine is fueling, determining a second fuel ethanol content estimate based on a change in sensor output when modulating a reference voltage of the exhaust oxygen sensor between the first voltage and a higher second voltage; and adjusting an engine operating parameter based on an error between the first and second fuel ethanol content estimates.

16. The method of claim 15, wherein the first condition includes a cold start and wherein the error includes a difference between the first and second fuel ethanol content estimates.

17. The method of claim 15, further comprising:

during a first condition when the error is less than a threshold, adjusting the engine operating parameter based on the first fuel ethanol content estimate; and during a second condition when the error is greater than the threshold, repeating the determining the second fuel ethanol content estimate to determine an updated second fuel ethanol content estimate and:

if the error between the first fuel ethanol content estimate and the updated second fuel ethanol content estimate remains above the threshold, adjusting the engine operating parameter based on one of the second fuel ethanol content estimate or the updated second fuel ethanol content estimate; and if the error between the first fuel ethanol content estimate and the updated second fuel ethanol content estimate is not greater than the threshold, adjusting the engine operating parameter based on the first fuel ethanol content estimate.

18. The method of claim 15, wherein the engine operating parameter includes one or more of a fuel injection amount and spark timing and further comprising adjusting the change in sensor output when modulating the reference voltage based on one or more of a first pressure correction factor based on a dry air pumping current of the exhaust oxygen sensor, a second pressure correction factor based on a water vapor environment of the exhaust oxygen sensor, an air-fuel ratio correction factor based on an measured and expected air-fuel ratio, and an ambient humidity.

19. A system for an engine, comprising:

an exhaust passage including an exhaust oxygen sensor; and a controller including computer readable instructions for:

estimating a first fuel ethanol content estimate based on an air-fuel ratio estimated with the exhaust oxygen sensor following a re-fueling event;

estimating a second fuel ethanol content estimate based on a change in pumping current output by the exhaust oxygen sensor upon applying a lower first voltage and a higher second voltage to the exhaust oxygen sensor when the engine is fueling and an engine temperature is greater than a threshold; and adjusting an engine operating parameter based on one of the first fuel ethanol content estimate and the second fuel ethanol content estimate, where a selection of the first or second fuel ethanol content estimate is based on a difference between the first and second fuel ethanol content estimates relative to a threshold error.

20. The system of claim 19, wherein the computer readable instructions further including adjusting the engine operating parameter based on the first fuel ethanol content estimate and not the second fuel ethanol content estimate when the difference between the first and second fuel ethanol content estimates is less than the threshold error and adjusting the engine operating parameter based on the second fuel ethanol content estimate and not the first fuel ethanol content estimate when the difference between the first and second fuel ethanol content estimates is greater than the threshold error.

* * * * *